US012255423B2

(12) United States Patent
De Bruijn et al.

(10) Patent No.: US 12,255,423 B2
(45) Date of Patent: Mar. 18, 2025

(54) CONTACT ARRANGEMENT FOR A CONNECTOR, CONNECTOR

(71) Applicants: TE Connectivity Nederland BV, s'Hertogenbosch (NL); TE Connectivity Germany GmbH, Bensheim (DE)

(72) Inventors: Jeroen Jozef Maria De Bruijn, 's-Hertogenbosch (NL); Wijnand Van Gils, s-Hertogenbosch (NL); Martin Szelag, Bensheim (DE); Peter Dirk Jaeger, s-Hertogenbosch (NL); Ulrich Buchmann, Bensheim (DE); Franz Mueller, Bensheim (DE); Nick Ottenbros, s-Hertogenbosch (NL)

(73) Assignees: TE Connectivity Germany GmbH, Bensheim (DE); TE Connectivity Nederland BV, s'Hertogenbosch (NL)

( * ) Notice: Subject to any disclaimer, the term of this patent is extended or adjusted under 35 U.S.C. 154(b) by 368 days.

(21) Appl. No.: 17/732,095

(22) Filed: Apr. 28, 2022

(65) Prior Publication Data

US 2022/0255266 A1 Aug. 11, 2022

Related U.S. Application Data

(63) Continuation of application No. PCT/EP2020/080222, filed on Oct. 28, 2020.

(51) Int. Cl.
*H01R 13/6461* (2011.01)
*H01R 13/6473* (2011.01)

(52) U.S. Cl.
CPC ..... *H01R 13/6461* (2013.01); *H01R 13/6473* (2013.01)

(58) Field of Classification Search
None
See application file for complete search history.

(56) References Cited

U.S. PATENT DOCUMENTS 3,740,698 A 6/1973 Jerominek
4,657,330 A 4/1987 Levy
(Continued)

FOREIGN PATENT DOCUMENTS

CN 104112921 A1 10/2014
CN 204144494 U * 2/2015
(Continued)

OTHER PUBLICATIONS

Japanese Office Action dated May 30, 2023 with English translation thereof, corresponding to Application No. 2022-524633, 12 pages.
(Continued)

*Primary Examiner* — Tho D Ta
(74) *Attorney, Agent, or Firm* — Barley Snyder

(57) ABSTRACT

A contact arrangement for a connector includes a plurality of contact elements each extending from a first connection side to a second connection side. A plurality of first end sections of a first subset of the contact elements contact a plurality of external elements in a first plane at the first connection side and a plurality of first end sections of a second subset of the contact elements contact a plurality of external elements in a second plane at the first connection side. The second plane is parallel to and spaced from the first plane in a height direction. A plurality of intermediate sections of at least some of the contact elements lie in a single common plane.

20 Claims, 40 Drawing Sheets

(56) References Cited

U.S. PATENT DOCUMENTS

| | | | | |
|---|---|---|---|---|
| 6,120,329 | A * | 9/2000 | Steinman | H01R 13/6461 439/676 |
| 6,165,018 | A | 12/2000 | Arnett et al. | |
| 6,926,542 | B2 * | 8/2005 | Li | H01R 12/57 439/79 |
| 8,057,263 | B1 * | 11/2011 | Howard | H01R 12/721 439/631 |
| 8,961,199 | B2 * | 2/2015 | Tai | H01R 12/724 439/79 |
| 9,531,130 | B1 * | 12/2016 | Phillips | H01R 13/6471 |
| 9,905,972 | B2 | 2/2018 | Lindkaym et al. | |
| 2013/0344739 | A1 | 12/2013 | Shih | |
| 2015/0244117 | A1 * | 8/2015 | Kawamura | H01R 13/6471 439/676 |
| 2016/0276780 | A1 | 9/2016 | Tanaka et al. | |
| 2017/0070009 | A1 * | 3/2017 | Chen | H01R 43/24 |
| 2018/0013218 | A1 | 1/2018 | Ge | |
| 2019/0173212 | A1 * | 6/2019 | Tsuji | H01R 13/6597 |
| 2019/0207337 | A1 | 7/2019 | Chen | |

FOREIGN PATENT DOCUMENTS

| | | | | |
|---|---|---|---|---|
| CN | 204144494 | U1 | 2/2015 | |
| CN | 107017526 | A * | 8/2017 | H01R 13/6471 |
| CN | 109273889 | A * | 1/2019 | H01R 12/7005 |
| DE | 102013103069 | B3 | 6/2014 | |
| EP | 0211496 | A1 | 6/1986 | |
| JP | 2000348827 | A | 12/2000 | |
| JP | 2015158992 | A | 9/2015 | |

OTHER PUBLICATIONS

Extended European Search Report, Application No. 19206613.2-1201, Dated: Apr. 30, 2020, 8 pages.

PCT International Search Report, Application No. PCT/EP/2020/080222, Dated: Dec. 1, 2020, 13 pages.

Chinese Office Action dated Jul. 26, 2024 with English translation, corresponding to Application No. 202080075516.6, 18 pages.

European Patent Office Communication dated Dec. 5, 2024, corresponding to Application No. 19 206 613.2-1201, 8 pages.

* cited by examiner

CONTACT ARRANGEMENT FOR A CONNECTOR, CONNECTOR

CROSS-REFERENCE TO RELATED APPLICATIONS

This application is a continuation of PCT International Application No. PCT/EP2020/080222, filed on Oct. 28, 2020, which claims priority under 35 U.S.C. § 119 to European Patent Application No. 19206613.2, filed on Oct. 31, 2019.

FIELD OF THE INVENTION

The invention relates to connector and, more particularly, to a contact arrangement for a connector.

BACKGROUND

Contact arrangements for connectors are known. In prior art connectors, data transmission with high transmission rates is not possible.

SUMMARY

A contact arrangement for a connector includes a plurality of contact elements each extending from a first connection side to a second connection side. A plurality of first end sections of a first subset of the contact elements contact a plurality of external elements in a first plane at the first connection side and a plurality of first end sections of a second subset of the contact elements contact a plurality of external elements in a second plane at the first connection side. The second plane is parallel to and spaced from the first plane in a height direction. A plurality of intermediate sections of at least some of the contact elements lie in a single common plane.

BRIEF DESCRIPTION OF THE DRAWINGS

The invention will now be described by way of example with reference to the accompanying Figures, of which.

DETAILED DESCRIPTION OF THE EMBODIMENT(S)

In the following, the invention will be described in greater detail and in an exemplary manner using embodiments and with reference to the drawings. The described embodiments are only possible configurations in which, however, the individual features as described herein can be provided independently of one another or can be omitted.

Figure 1:
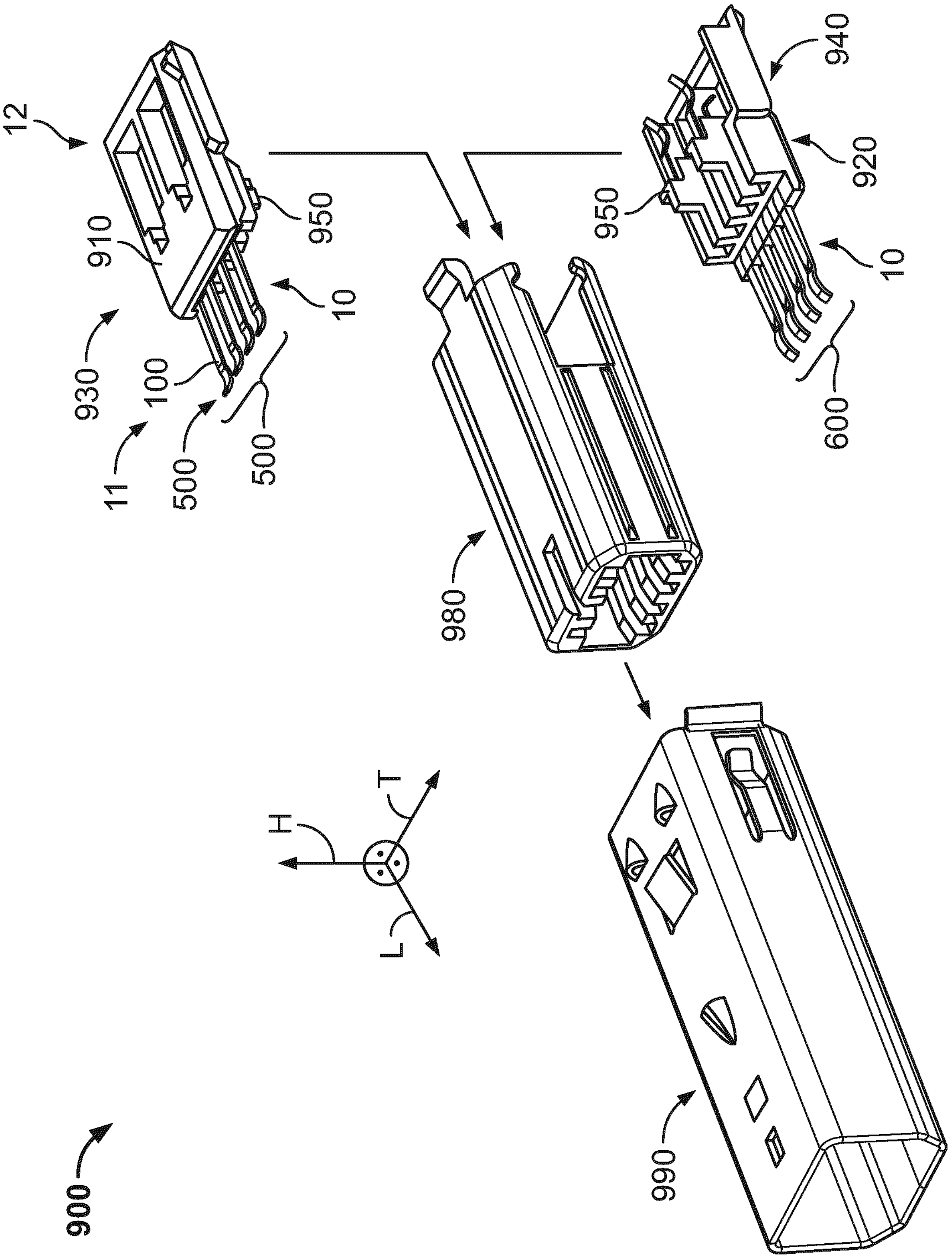
FIG. 1 shows a schematic perspective exploded view of a connector.

FIG. 1 shows a general layout of a connector 900. The connector 900 comprises several contact elements 10 made from sheet metal by cutting and/or punching. The contact elements 10 each extend from a first connection side 11 to a second connection side 12 in order to contact different external elements. For example, the connector 900 can be an input/output connector like an RJ45-connector.

A fifth subset 500 of the contact elements 10 is held in a first support piece 910, a sixth subset 600 of the contact elements 10 is held in a second support piece 920 that can be joined with the first support piece 910. In each of the subsets 500, 600 the contact elements are mechanically coupled to each other by the support piece 910, 920.

Together with the contact elements 10, the first and second support piece 910, 920 make up a first piece 930 and a second piece 940 of the connector 900 that can be joined along a height direction H and held together by a housing 980. The resulting assembly can then be inserted into a shielding 990.

The first support piece 910, the second support piece 920 and the housing 980 can be made from a plastic material, for example by injection molding.

The contact elements 10 each extend along a longitudinal or length direction L that is perpendicular to the height direction H. In each subset 500, 600 at least first end sections 21 of the contact elements 10 are arranged behind each other along a transverse direction T that is perpendicular to the height direction H and transverse to the length direction L.

Figure 2:
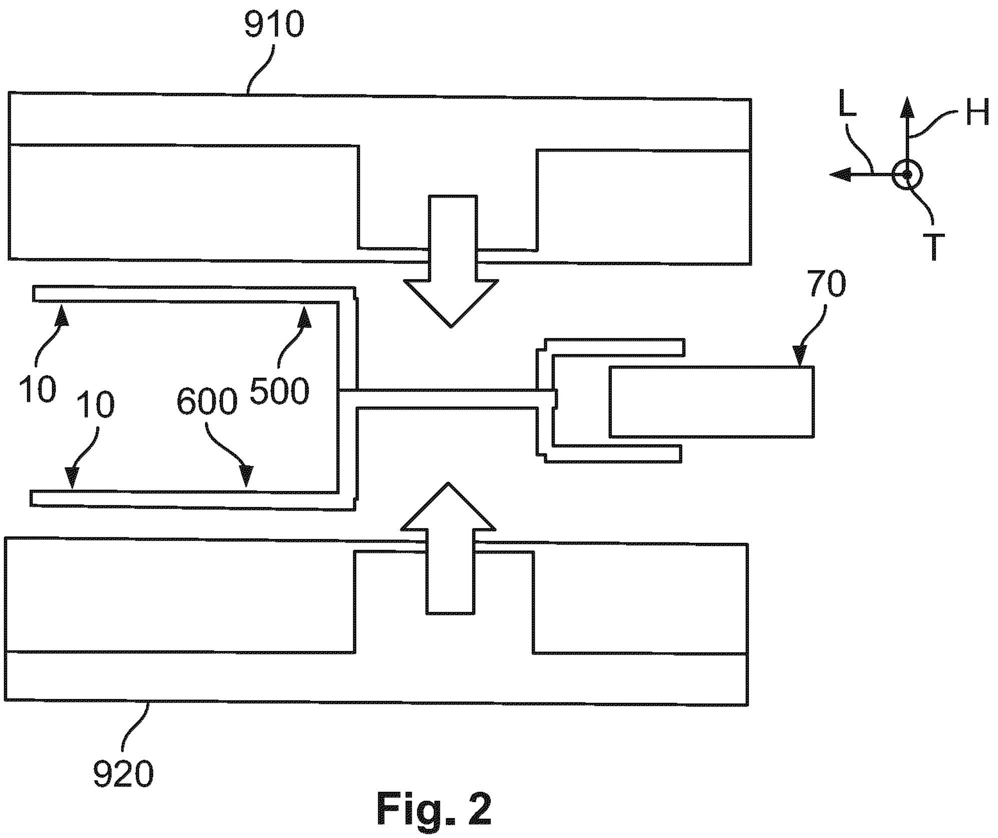
FIG. 2 shows a schematic sectional view through a connector.
Figure 3:
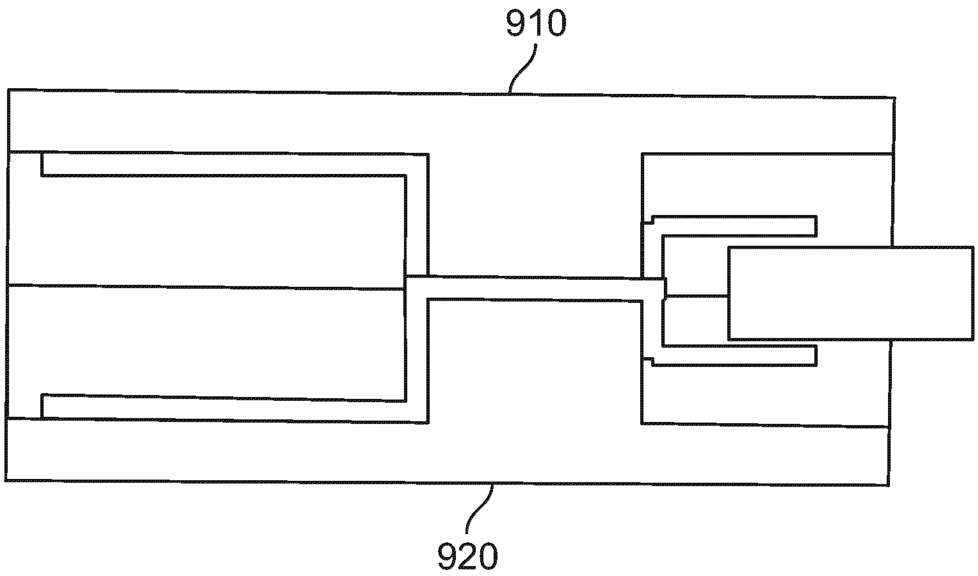
FIG. 3 shows a schematic sectional view through a connector.

As can be seen in FIGS. 2 and 3, the contact elements 10 have shapes that allow them to be held in the first and the second support piece 910 and 920 by a positive fit without the need for further holding elements like latches.

Figure 4:
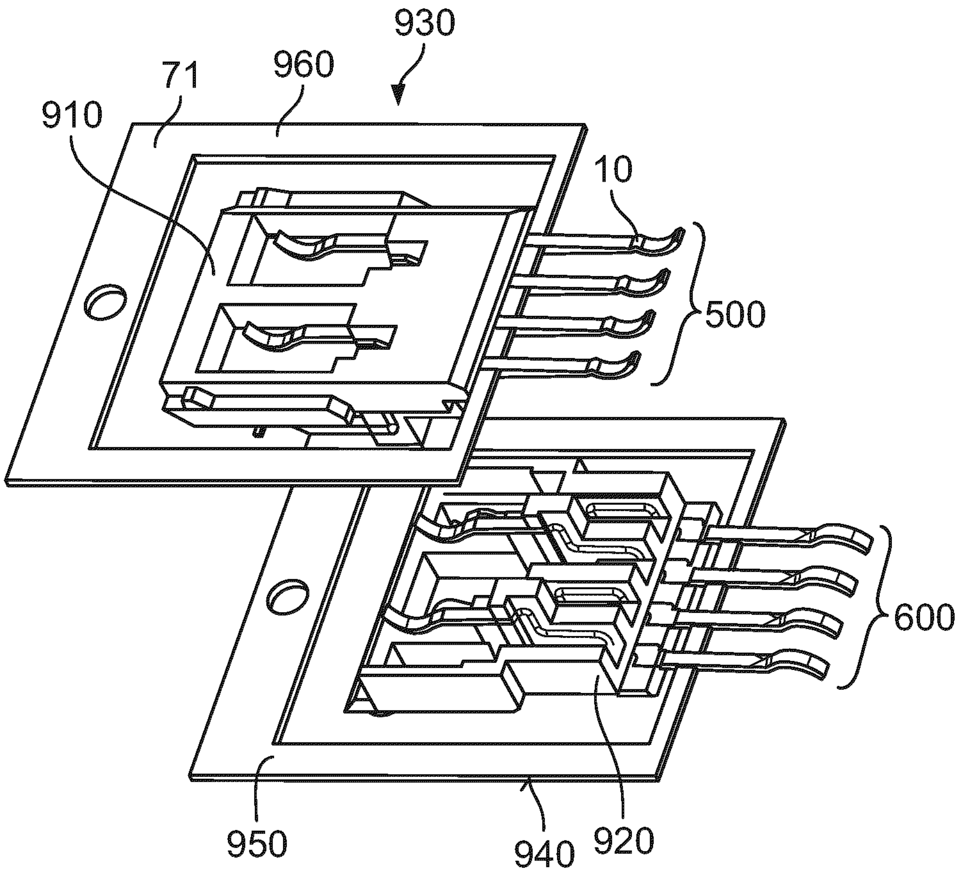
FIG. 4 shows a schematic perspective view of partially unfinished pieces for a connector.

FIG. 4 shows the two pieces 930, 940 in a semi-finished state. Frames 960 of the molding process are still present. It can further be seen that the contact elements 10 are embedded in the first and second support pieces 910, 920.

Figure 5:
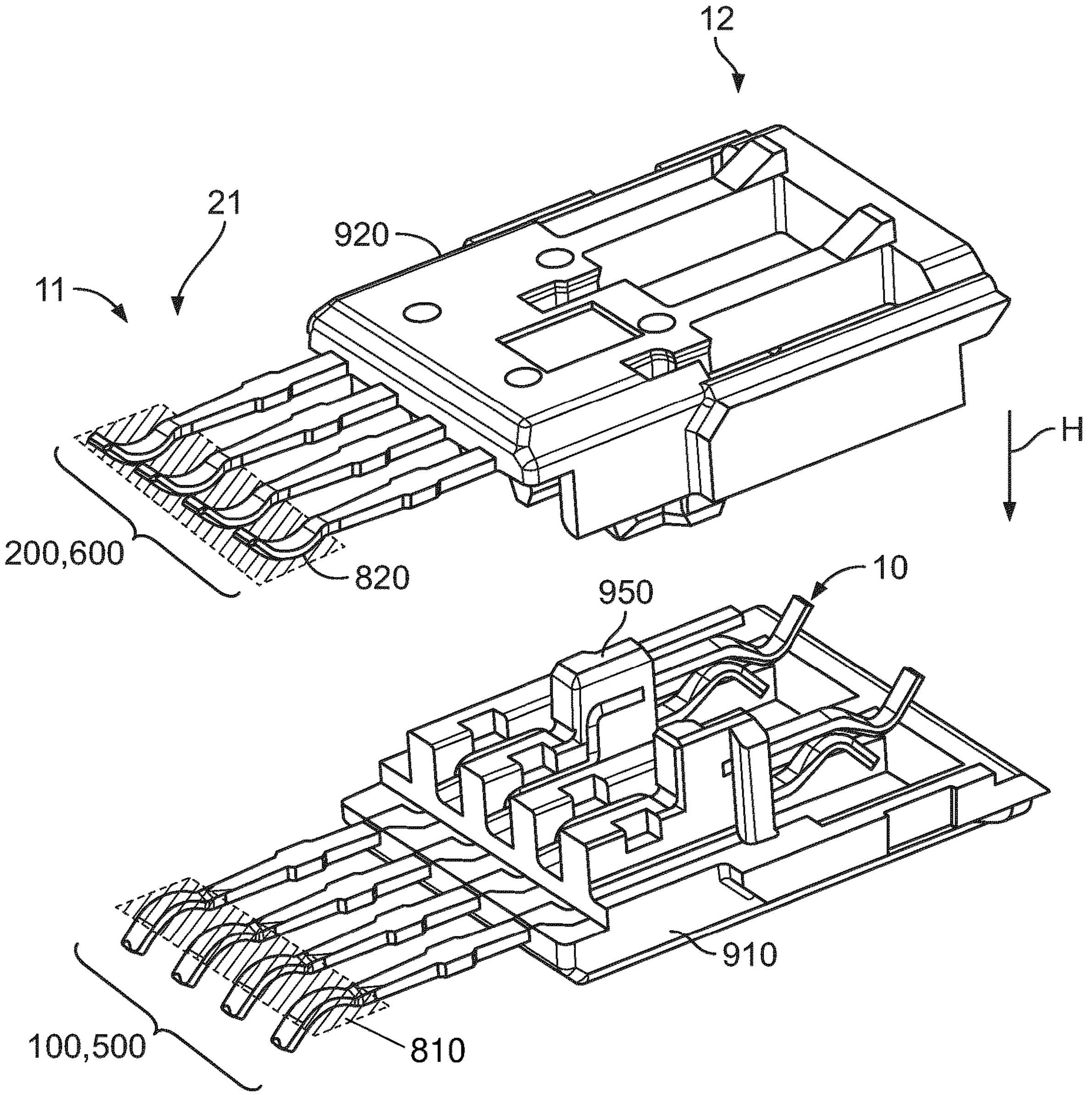
FIG. 5 shows a schematic perspective view of pieces for a connector.

In FIG. 5, the support pieces 910, 920 are separated from the frames 960. Further, it can be seen that first end sections 21 of a first subset 100 of the contact elements 10 are configured to contact the external elements in a first plane 810 and first end section 21 of a second subset 200 of the contact elements 10 are configured to contact the external elements in a second plane 820. The first subset 100 is also the fifth subset 500 referred to in FIG. 1. Further, the second subset 200 is identical to the sixth subset 600 referred to in FIG. 1. In order to allow an easy positioning of the first piece 930 relative to the second piece 940, positioning elements 950 are present on the first and the second piece 930, 940. The first and the second subset 100, 200 can contain all the contact elements 10. No further contact elements can be present in the connector 900 in such a case.

Figure 6:
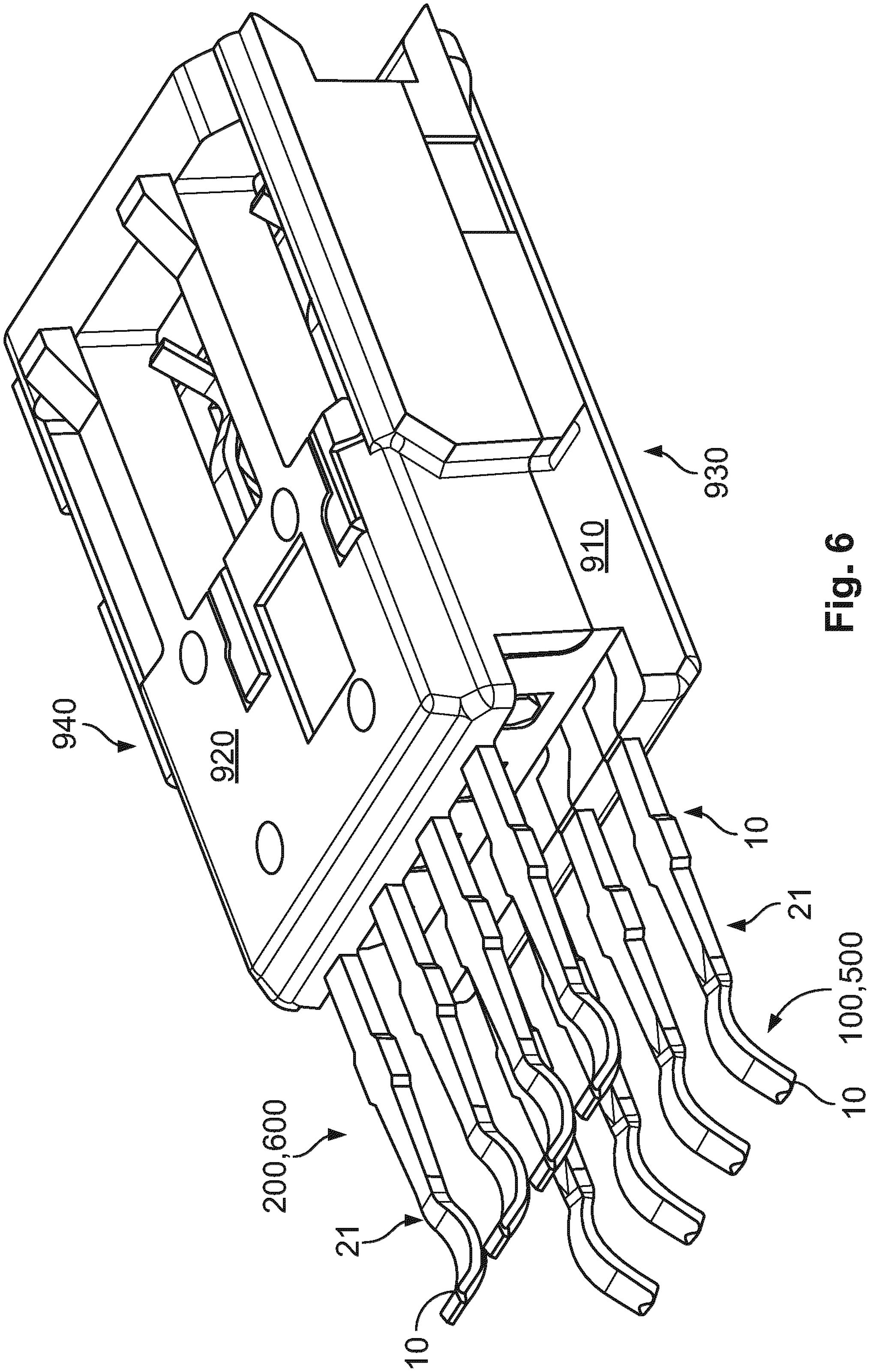
FIG. 6 shows a schematic perspective view of the pieces of FIG. 5 in an assembled state.
Figure 7:
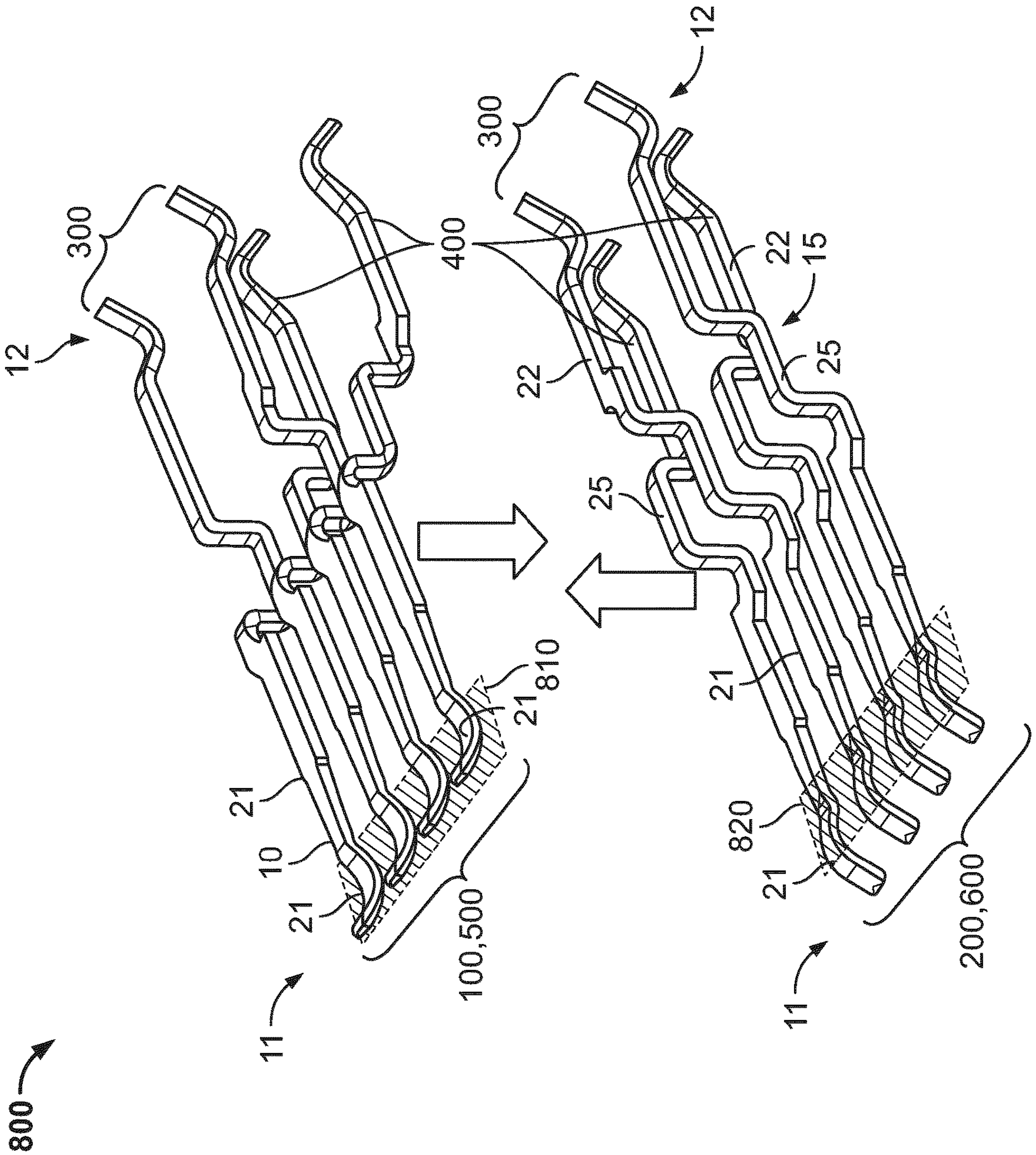
FIG. 7 shows a schematic perspective view of the connection arrangement of the embodiment of FIGS. 5 and 6.
Figure 8:
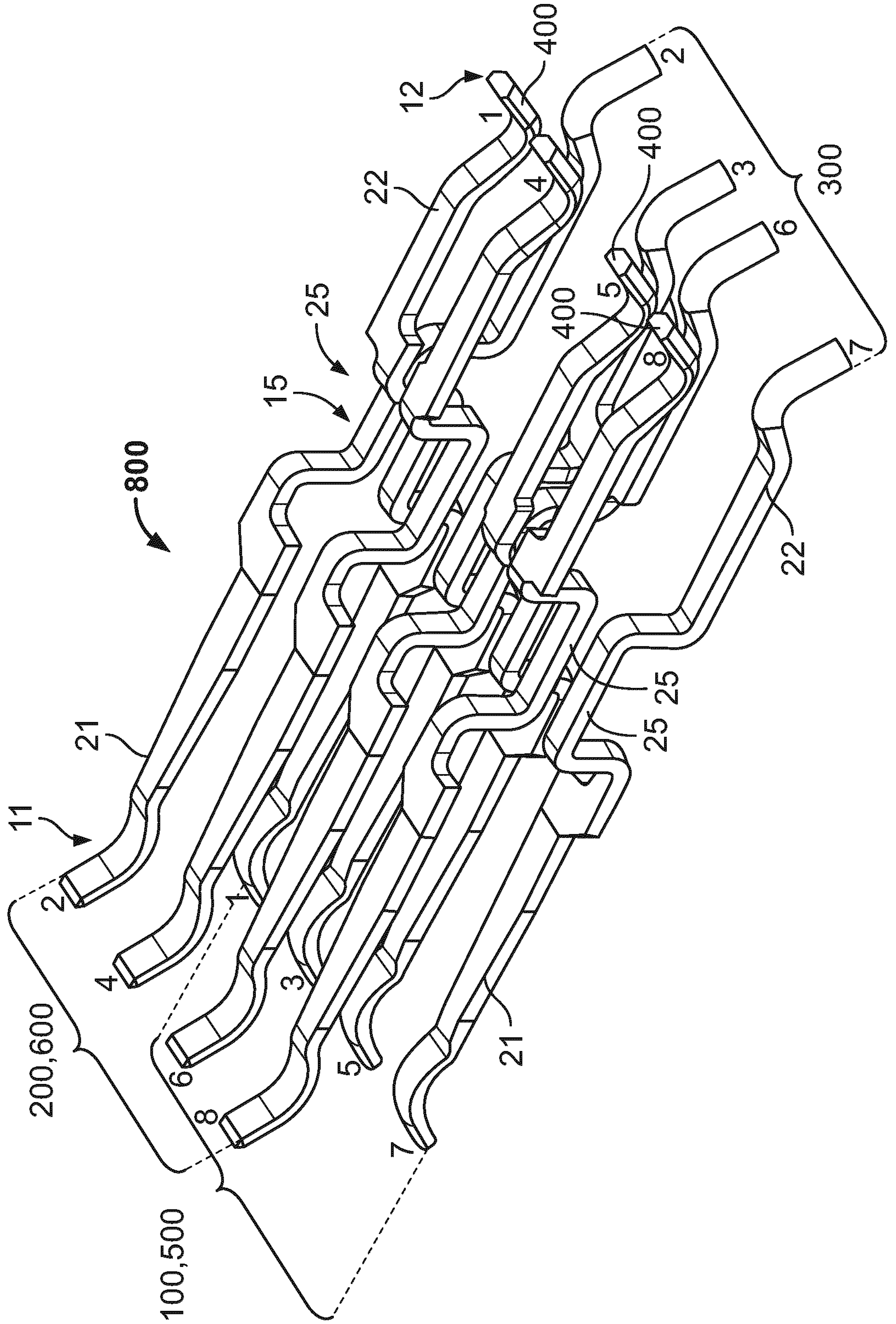
FIG. 8 shows a further schematic perspective view of the connection arrangement of FIG. 7.

In FIG. 6, the two pieces 930, 940 are joined together. An external element can be inserted between the first end sections 21 of the contact elements 10, and the contact elements 10 then contact this external element on two opposite sides.

In FIGS. 7 to 12, the contact elements 10 are shown without the support pieces 910, 920. It can be seen that at the first connection side 11, the first end sections 21 of the contact elements 10 are grouped in the first subset 100 and the second subset 200. At a second connection side 12, the second end sections 22 of a subset of the first subset 100 and subset of the second subset 200 are configured to contact the external element at a third plane 830. The remaining contact elements 10 of the first subset 100 and the second subset 200 are configured to contact the external element at a fourth plane 840.

The planes 810, 820, 830, 840 can here be defined by contact points 52 located on the contact surfaces 51. The contact surfaces 51 can be bent, for example convex, arc-shaped, cylindrical or similar. The contact point 52 can for example be the outmost point of the contact surface 51 in the height direction. A plurality of the contact points 52 on different contact elements 10 can define the first plane 810 and/or the second plane 820. The plurality of the contact points 52 on different contact elements 10 can lie within the first plane 810 and/or the second plane 820.

At a compensation area 15 between the first connection side 11 and the second connection side 12, all the intermediate sections 25 of the contact elements 10 are configured or adapted to lie in a plane 880 in an assembled state. In particular, all of the intermediate sections 25 of the contact elements 10 lie in this plane 880 in the assembled state. This results in a good signal performance, as a cross talk between the contact elements 10 is minimized. Thus, the transmission rate can be high.

Figure 9:
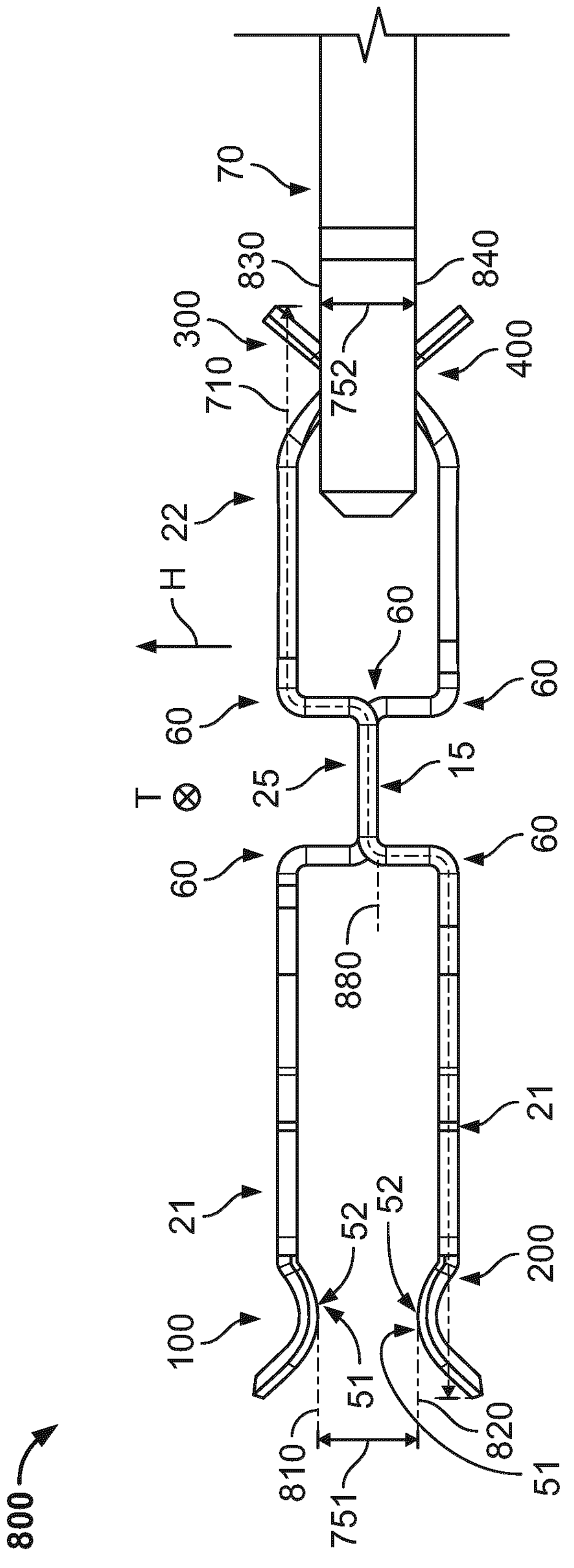
FIG. 9 shows a schematic side view of the connection arrangement of FIG. 7 mounted to a PCB.
Figure 10:
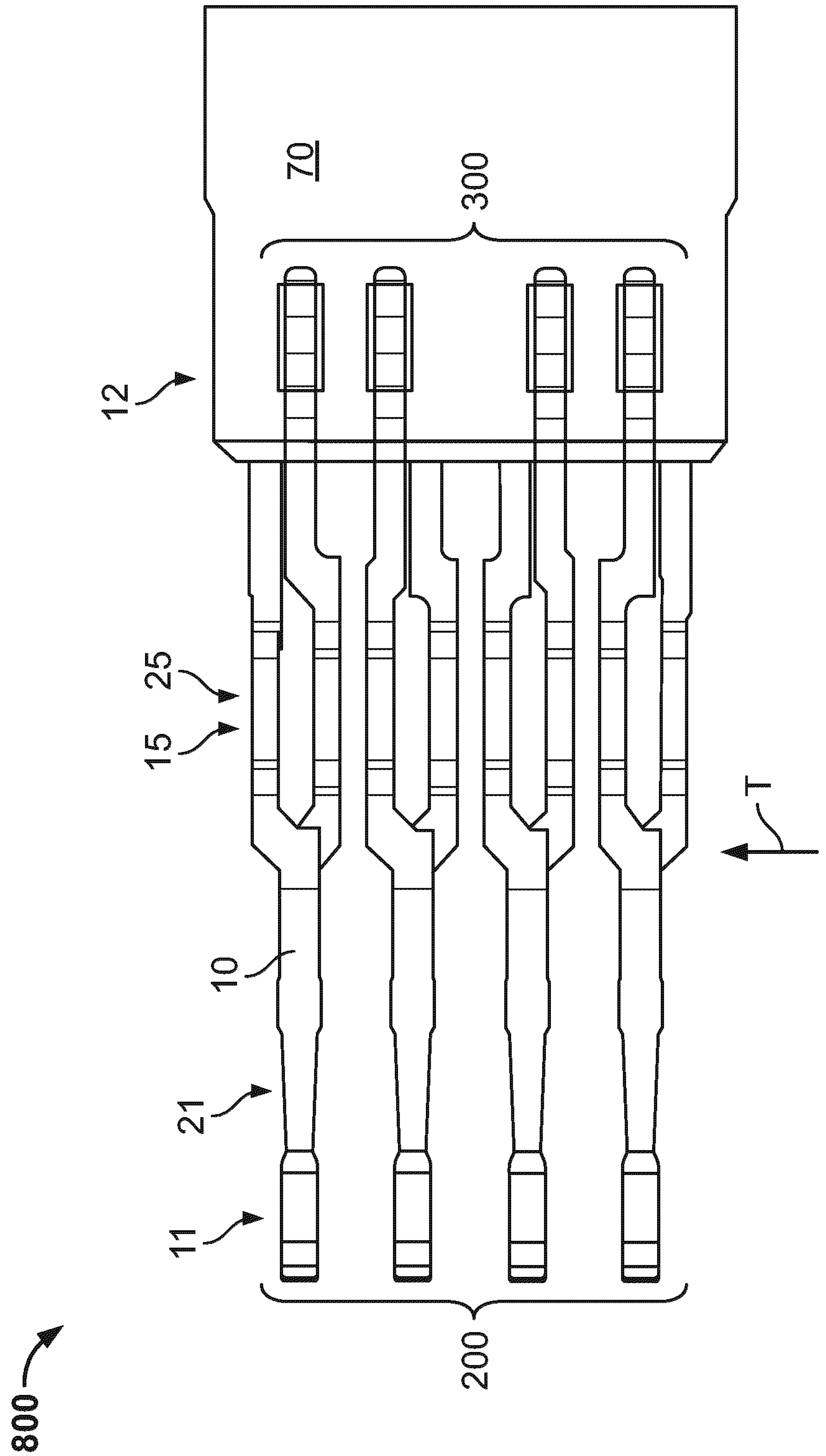
FIG. 10 shows a schematic top view of the connection arrangement of FIG. 7 mounted to a PCB.
Figure 11:
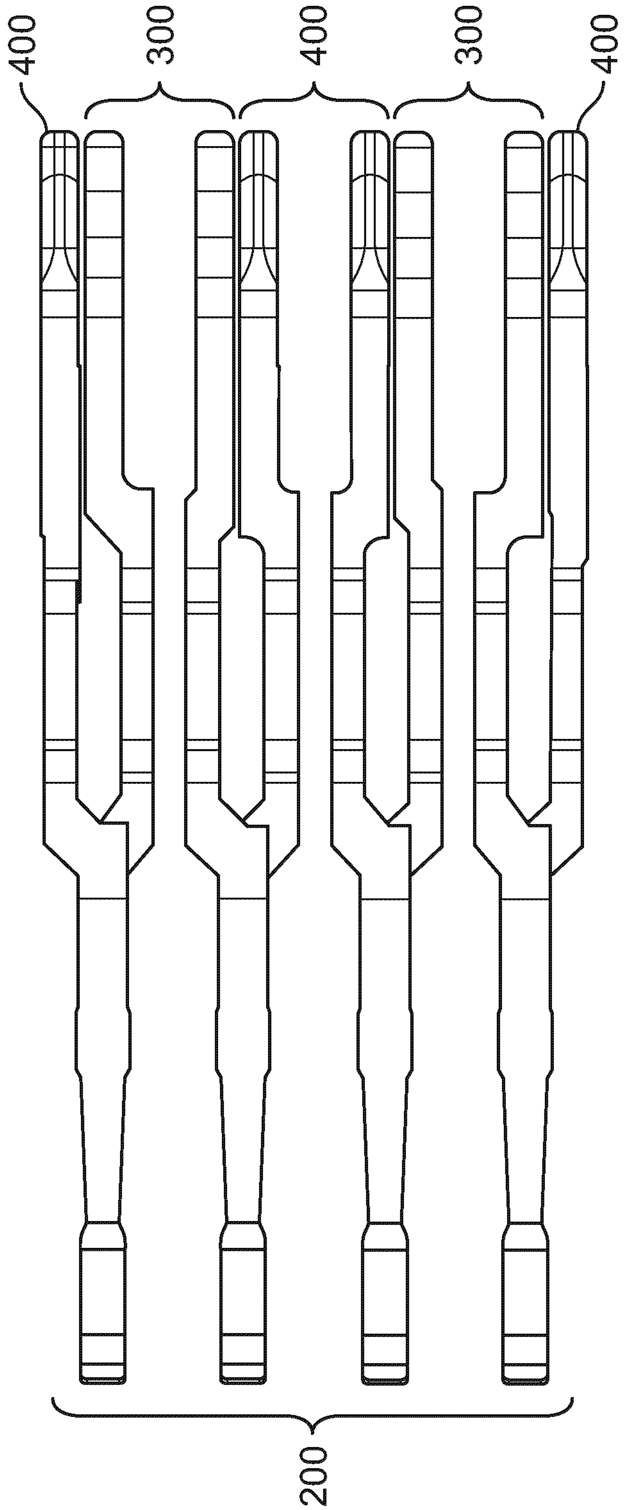
FIG. 11 shows a further schematic top view of the connection arrangement of FIG. 7 without the PCB.
Figure 12:
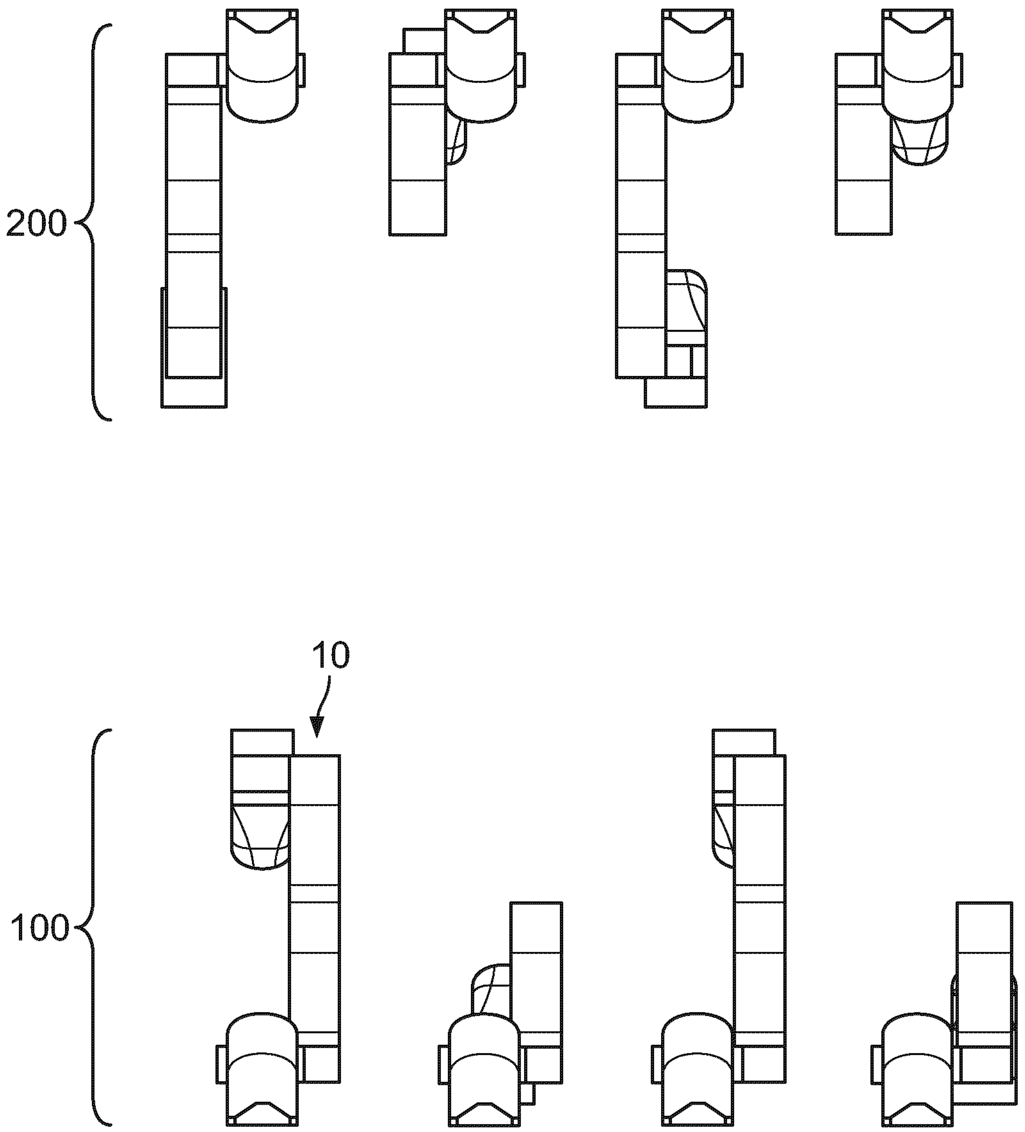
FIG. 12 shows a schematic front view of the connection arrangement of FIG. 11.

The first plane 810 is spaced from the second plane 820 by a distance 751 along the height direction H. The third plane 830 is spaced from the fourth plane 840 by a distance 752 along the height direction H, as shown in FIG. 9. The plane 880 is located approximately centrally between the first plane 810 and the second plane 820 and approximately centrally between the third plane 830 and the fourth plane 840. The plane 880 is different from the first 810, the second 820, the third 830, and/or the fourth 840 plane, which can result in good decoupling. In other embodiments, the plane 880 of the intermediate sections 25 can lie between the first and the second plane 810, 820 and/or between the third and the fourth plane 830, 840, but shifted away from the exact middle plane between the two respective planes.

The intermediate sections 25 of the contact elements are all parallel to each other and arranged behind each other in the transverse direction T.

In order to improve the signal performance, the contact elements 10 each only comprise the first end section 21, the first connection section 31, the intermediate section 15, the second connection section 32 and the second end section 22. Each contact element 10 is a monolithic element comprising only a single element, namely a metal strip. The first end sections, 21 the second end sections 22, and the intermediate sections 25 can be substantially planar or straight.

In one embodiment, at least one contact element 10 of the first subset 100 and at least one contact element 10 of the second subset 200 may swap positions at the second connection side 12 with respect to the direction perpendicular to the first and/or second plane 810, 820. In such an embodiment, each of the two contact elements 10 crosses an intermediate plane 25 extending between and parallel to the first and second plane 810, 820 once or an uneven number of times. In an embodiment, the two swapped contact elements 10 are located opposite one another at at least one of the first and second end with respect to e.g. the intermediate plane 25.

Figure 13:
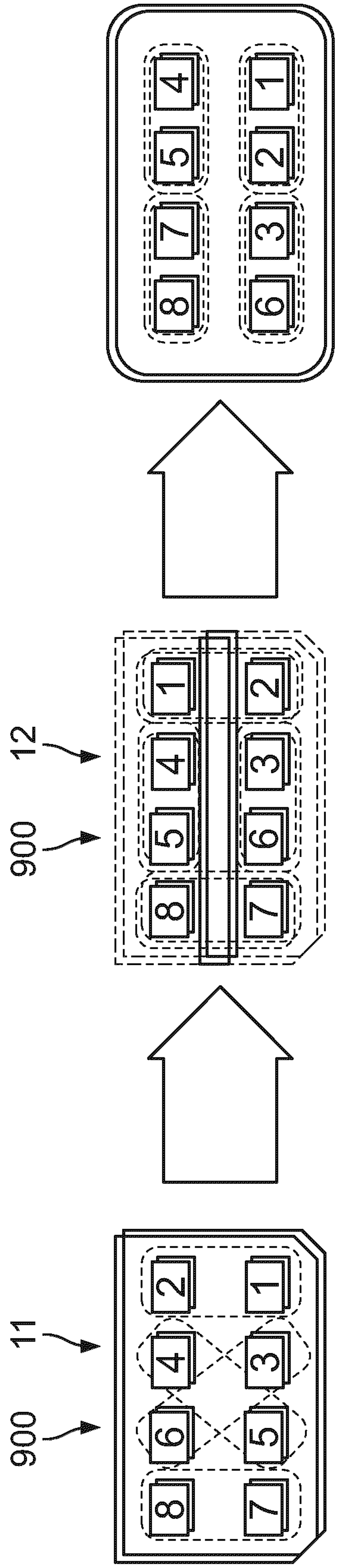
FIG. 13 shows schematic views of the configurations of the lines in the connection arrangement of FIG. 7 and the corresponding changes therein.
Figure 14:
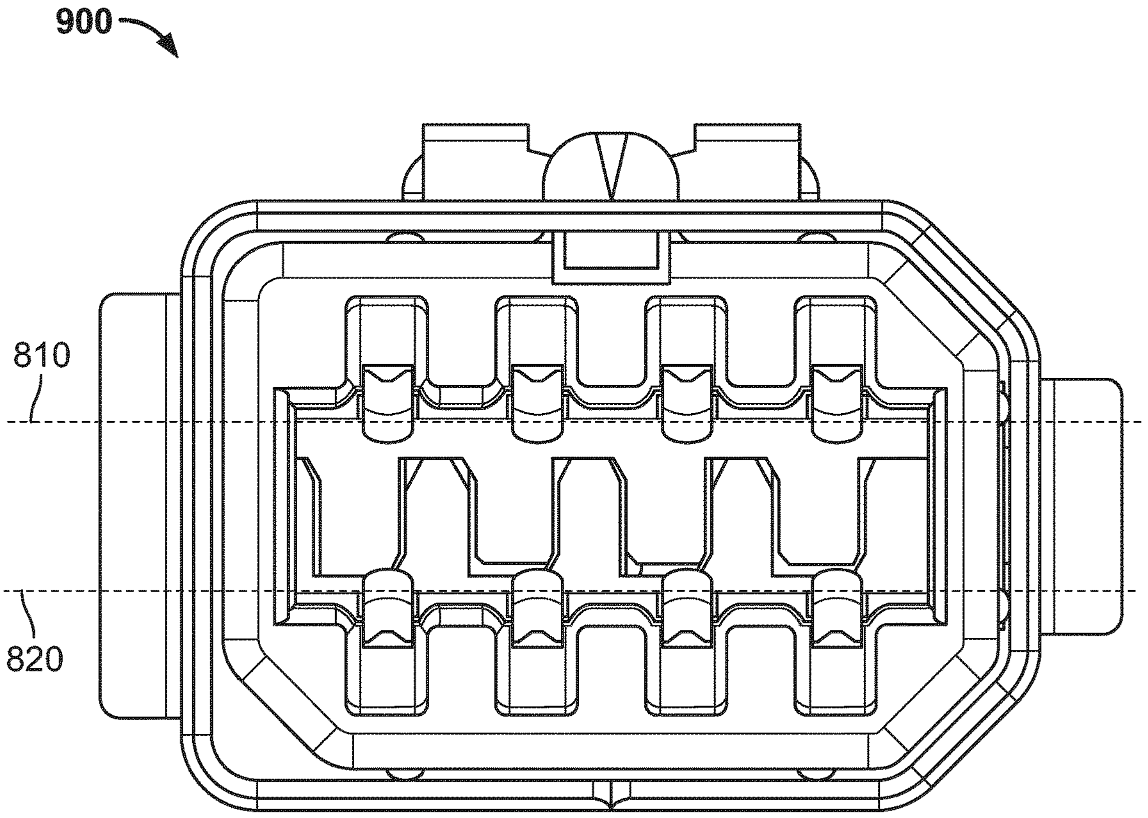
FIG. 14 shows a schematic front view of a connector.
Figure 15:
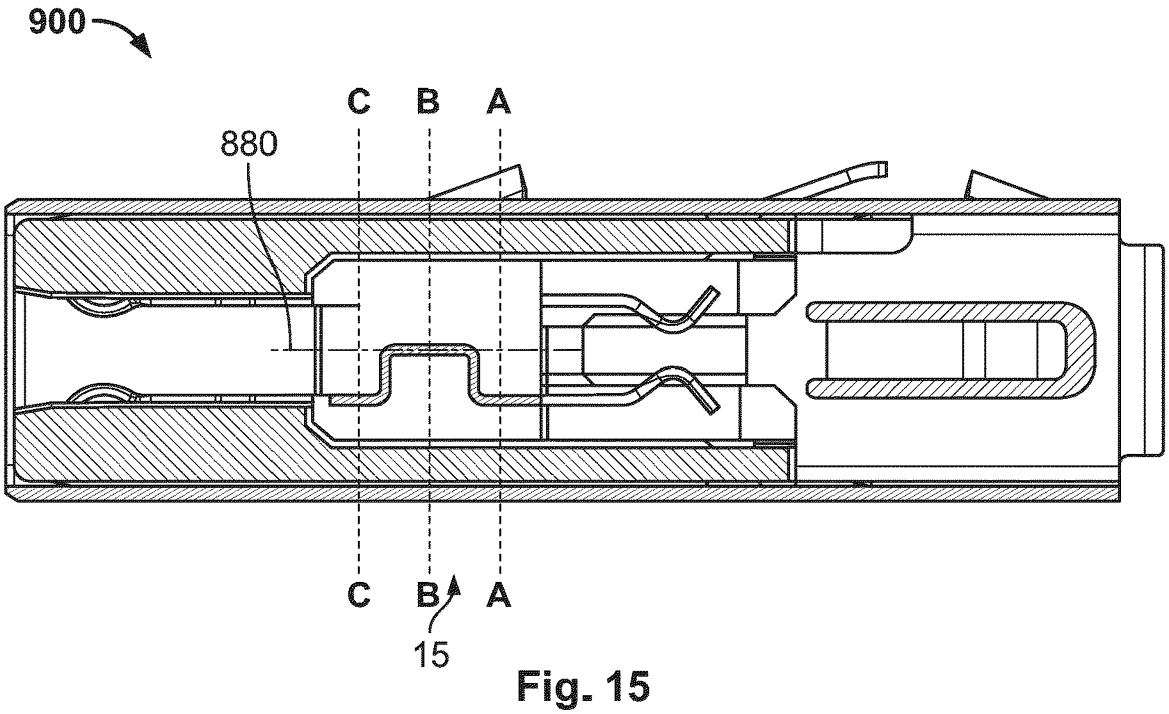
FIG. 15 shows a schematic sectional side view through the connector of FIG. 14.

In FIG. 13, the change of the lines 1 to 8 due to the contact arrangement 800 can be seen in the comparison between the configuration on the left-hand side and the configuration in the middle. It can be seen that the positions of lines 1 and 2 and the positions of lines 5 and 6 are swapped. In a further step that can, for example, be done on a PCB 700, and that can be seen by the comparison between the configuration in the middle and the configuration on the right-hand side, further positions can be swapped.

Figure 16A:
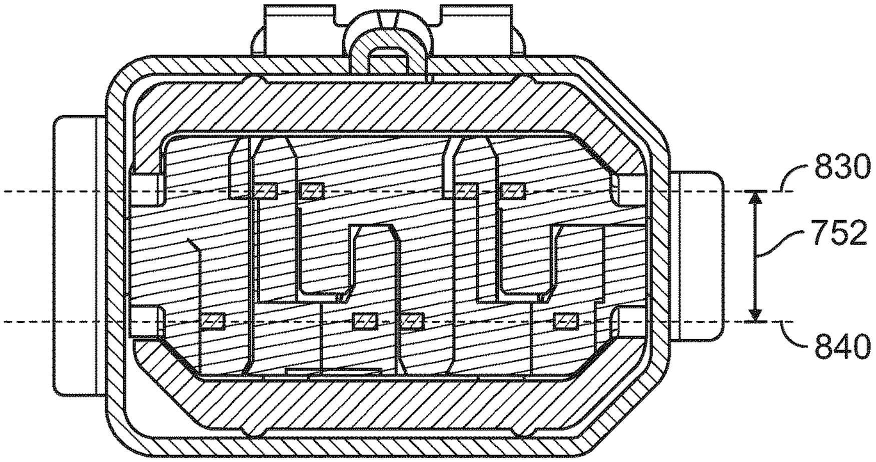
FIGS. 16A, 16B, 16C show schematic sectional views through the connector of FIG. 14 along the planes indicated in FIG. 15.
Figure 16B:
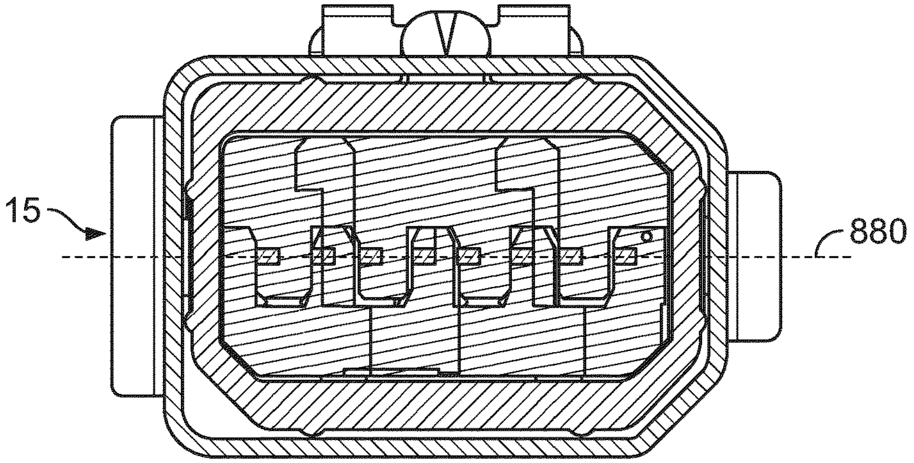
Figure 16C:
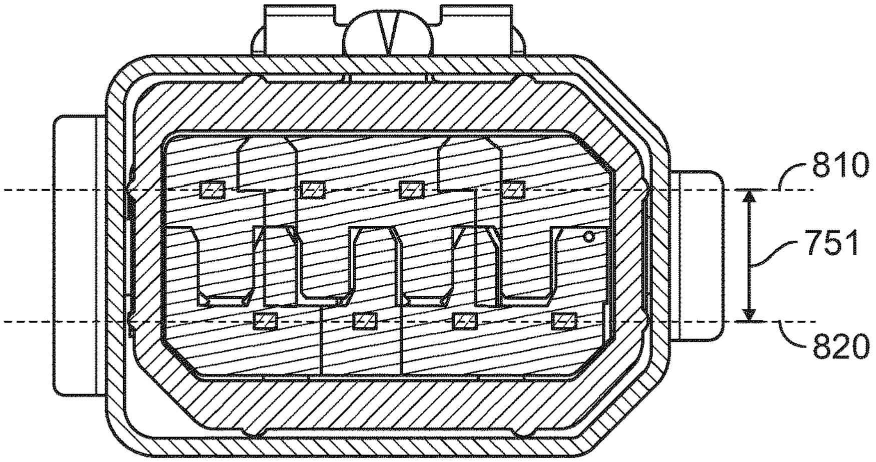

In FIGS. 14, 15, 16A, 16B and 16C a further connector can be seen. FIGS. 16A, 16B and 16C in particular show sections through the connector along the planes indicated by A, B and C in FIG. 15. While in the section across C, the cross sections of the contact elements 10 are located in two planes 810 and 820; they lie in a single common plane 880 in the cross section along plane B. In the section along plane A, the cross sections of the contact elements 10 again lie in two different planes 830, 840.

Figure 17:
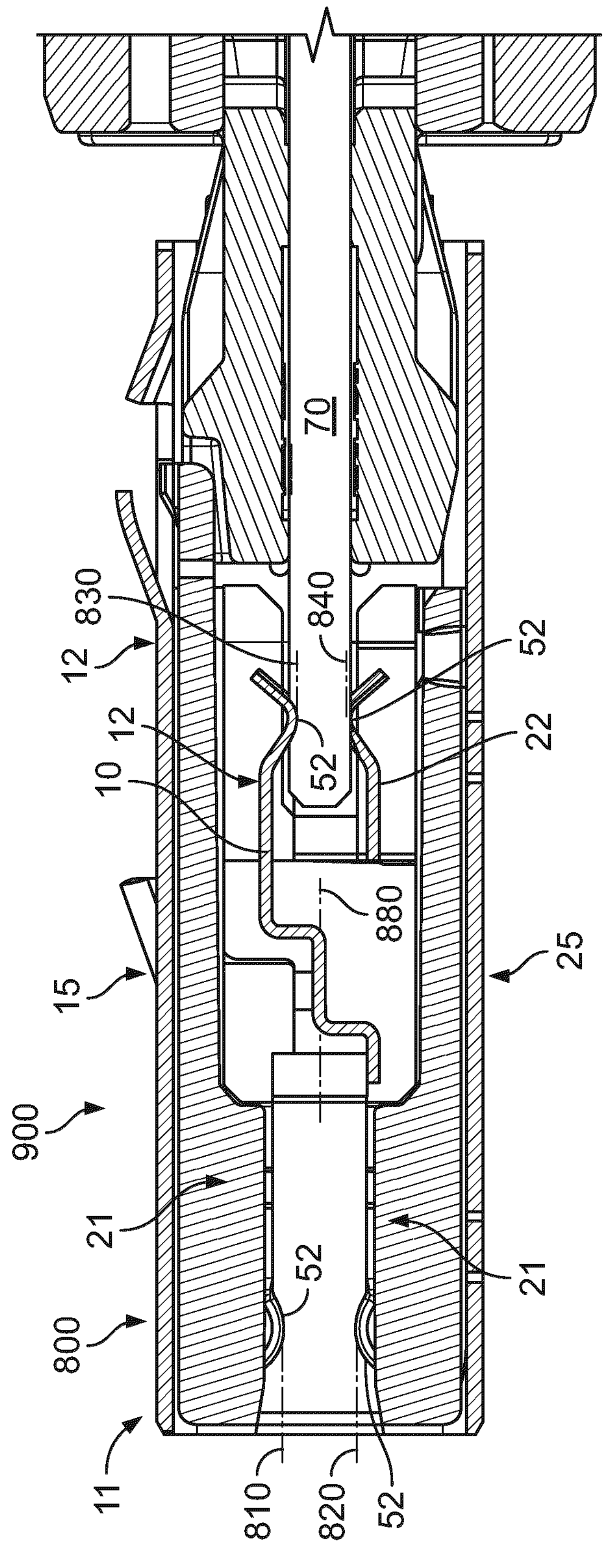
FIG. 17 shows a schematic sectional view of an embodiment of a connector along a first plane.
Figure 18:
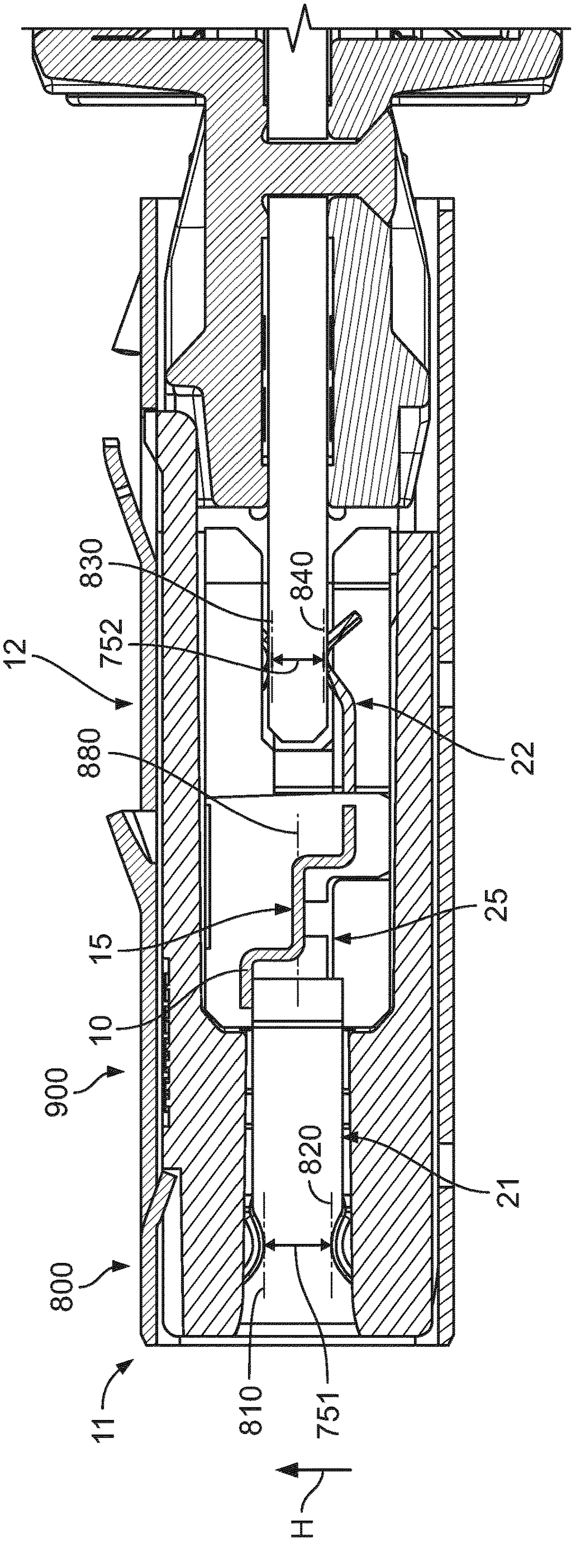
FIG. 18 shows a schematic sectional view of the embodiment of FIG. 17 along a second plane.

In FIGS. 17 and 18, the configurations of two specific contact elements 10 are shown. In FIG. 17, the course of the contact element 10 goes from the second plane 820 to the common plane 880 and then to the third plane 830. In FIG. 18, the course of a different contact element 10 goes from the first plane 810 to the common plane 880 and then to the fourth plane 840. Both are at the compensation area 15 that is located between the first connection side 11 and second connection side 12 at least in the area of the intermediate section 25 located in the common single plane 880.

Figure 19:
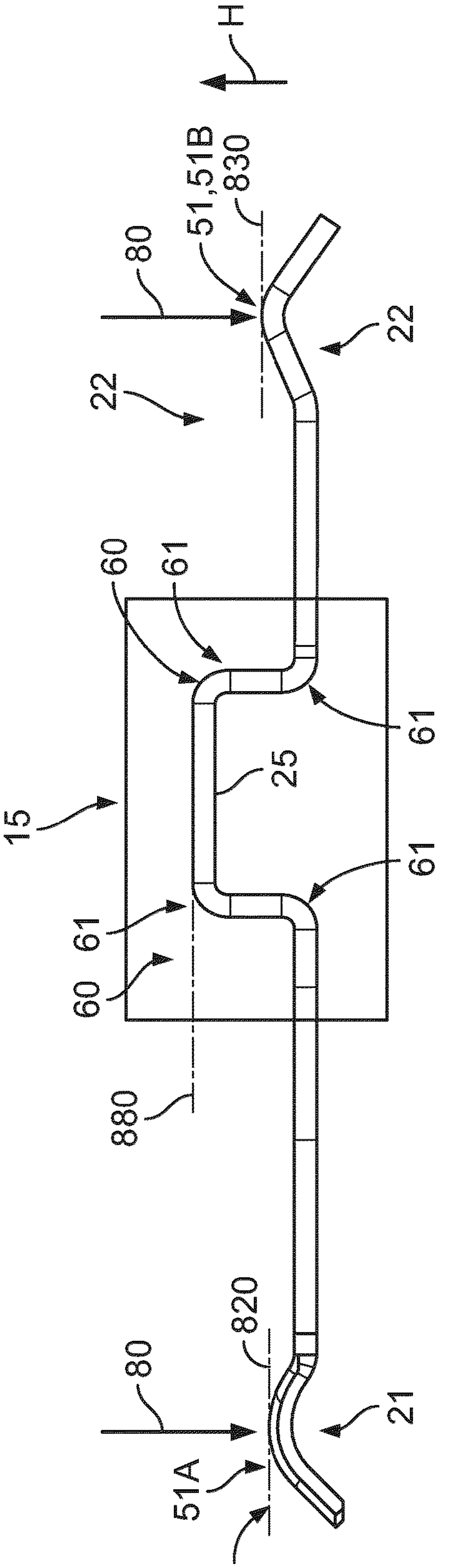
FIGS. 19 and 20 show schematic side views of different embodiments of contact elements.
Figure 20:
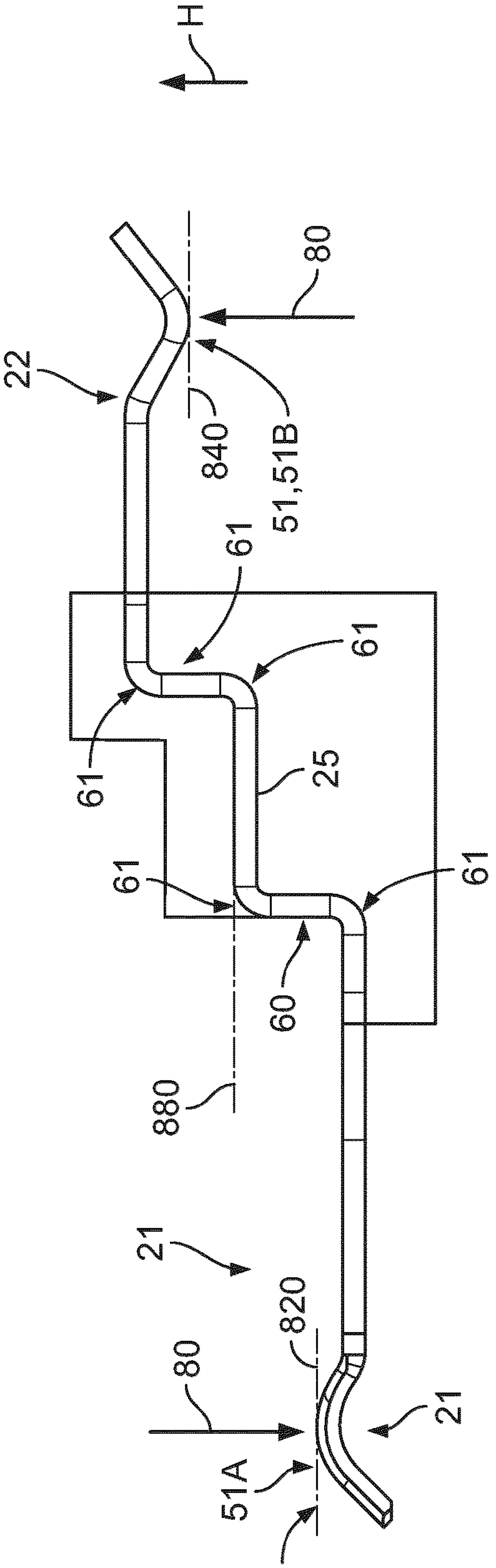

In FIGS. 19 and 20, two contact elements 10 are depicted that have a different reaction behavior towards external contact forces 18. While in FIG. 19 both contact surfaces 51, 51A, 51B at the first end section 21 and the second end section 22 face along the height direction H, the contact surfaces 51, 51A, 51B in the embodiment of FIG. 20 face in opposite directions. The contact surface 51, 51A at the first end section 21 faces in the height direction H while the contact surface 51, 51B at the second end section 22 faces against the height direction H. An advantage of the configuration in FIG. 19 is that the contact forces 80 act in the same direction and thus a torque acting on the contact element 10 is minimized. The term "face" can mean that a vector that is perpendicular to the surface points away from the surface in a certain direction. The vector can in particular be defined in the contact point.

In the embodiment of FIGS. 19 and 20, it can also be seen that the intermediate sections 25 are each located between two steps 60. The steps 60 lead from one plane to another plane and comprise two bends 61. Each of the bends 61 in the depicted embodiments is a 90°-bend. Consequently, a connection section 31 located between the first end section 21 and the intermediate section 25 and a contact section 32 located between the intermediate section 25 and the second end section 22 are each perpendicular to the intermediate section 25 and the first and the second end sections 21, 22. This can result in an improved signal performance and allow an easy manufacturing.

The two steps shown in FIG. 20 go in different directions relative to the intermediate section 25. While one of the steps 60 goes upwards, the other one goes downwards.

Figure 21:
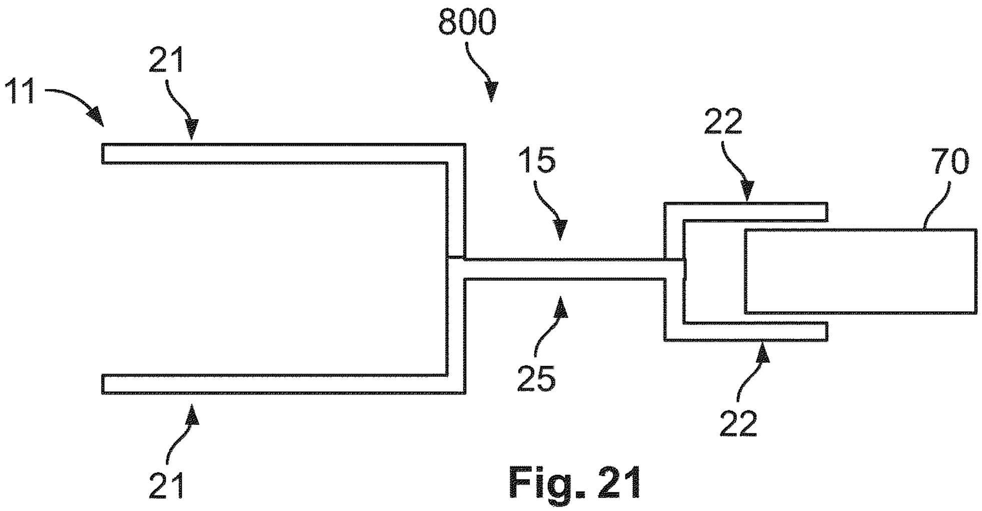
FIG. 21 shows a schematic side view of a first group of different embodiments of a contact arrangement.
Figure 22:
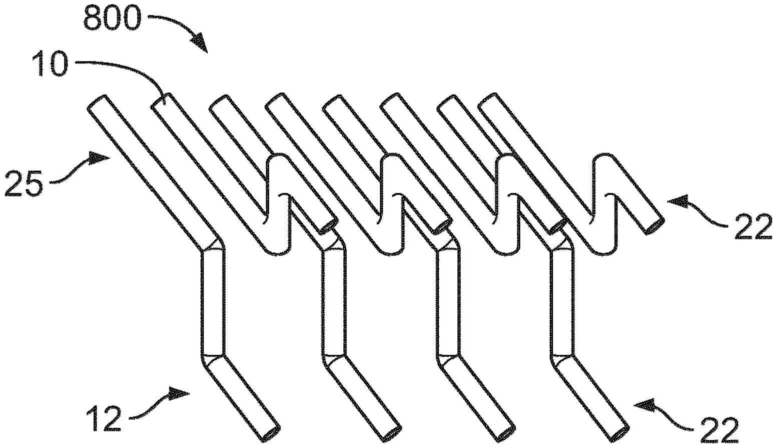
FIG. 22 shows a schematic perspective view of parts of a first embodiment belonging to the first group of embodiments of FIG. 21.
Figure 23:
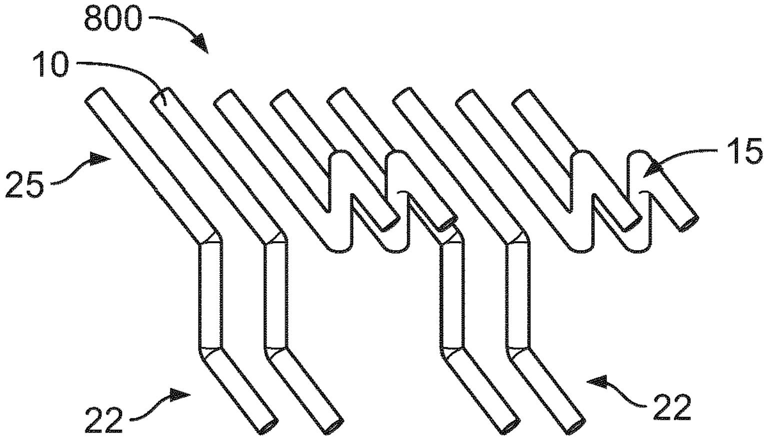
FIG. 23 shows a schematic perspective view of parts of a second embodiment belonging to the first group of embodiments of FIG. 21.

In FIGS. 21 to 23, a first group of contact arrangements 800 is depicted. This group has in common that at the second end section 22 a PCB 70 is contacted on two opposite sides. In the first embodiment shown in FIG. 22, the contact elements 10 are arranged in an alternating manner. In the configuration shown in FIG. 23, two neighboring contact elements 10 are paired and contact the same side of the PCB 70.

Figure 24:
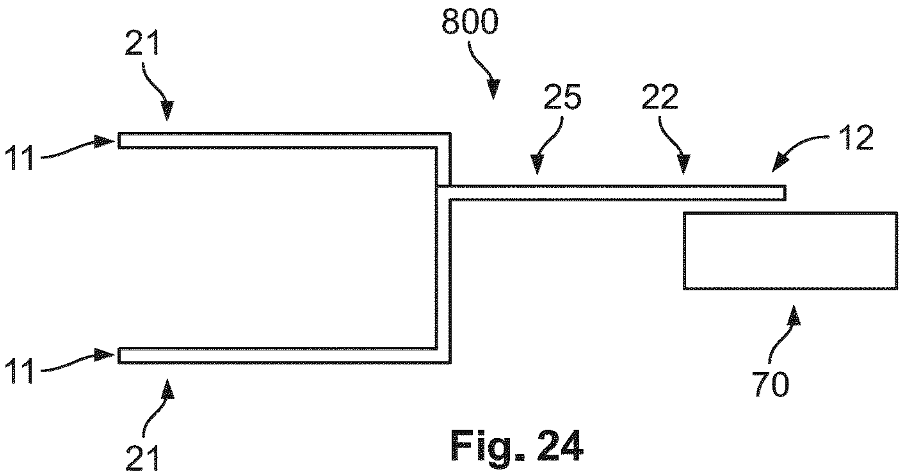
FIG. 24 shows a schematic side view of a second group of different embodiments of a contact arrangement.
Figure 25:
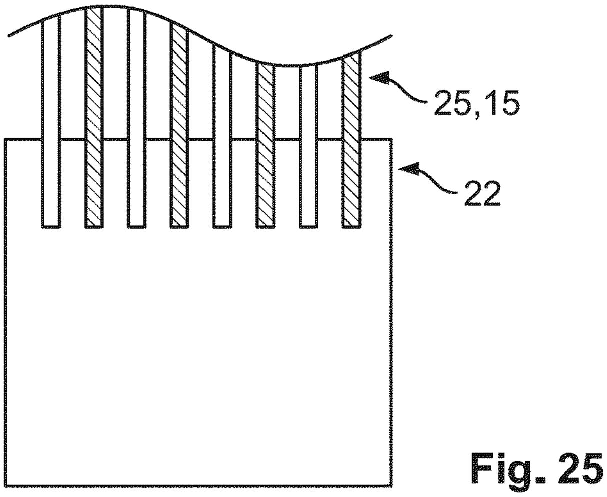
FIG. 25 shows a schematic perspective view of parts of a first embodiment belonging to the second group of embodiments of FIG. 24.
Figure 26:
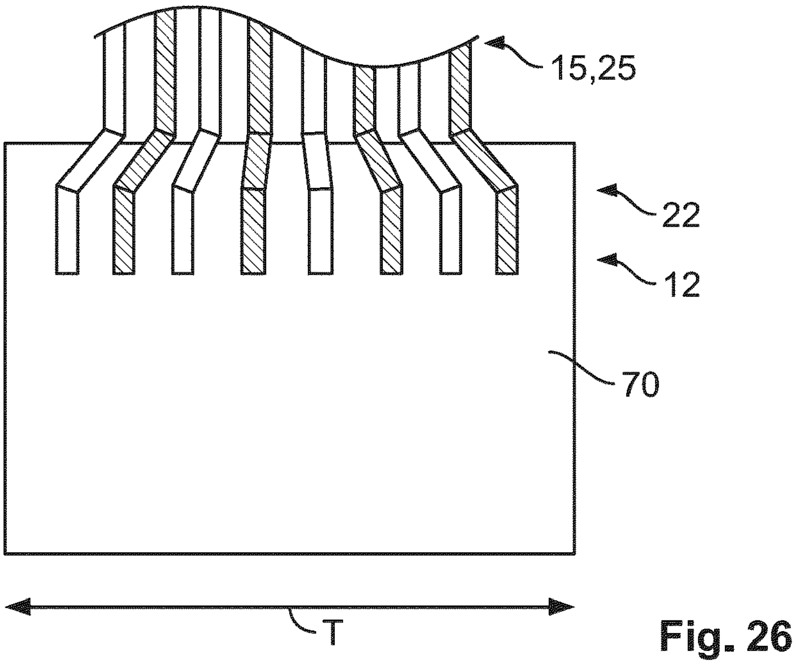
FIG. 26 shows a schematic perspective view of parts of a second embodiment belonging to the second group of embodiments of FIG. 24.
Figure 27:
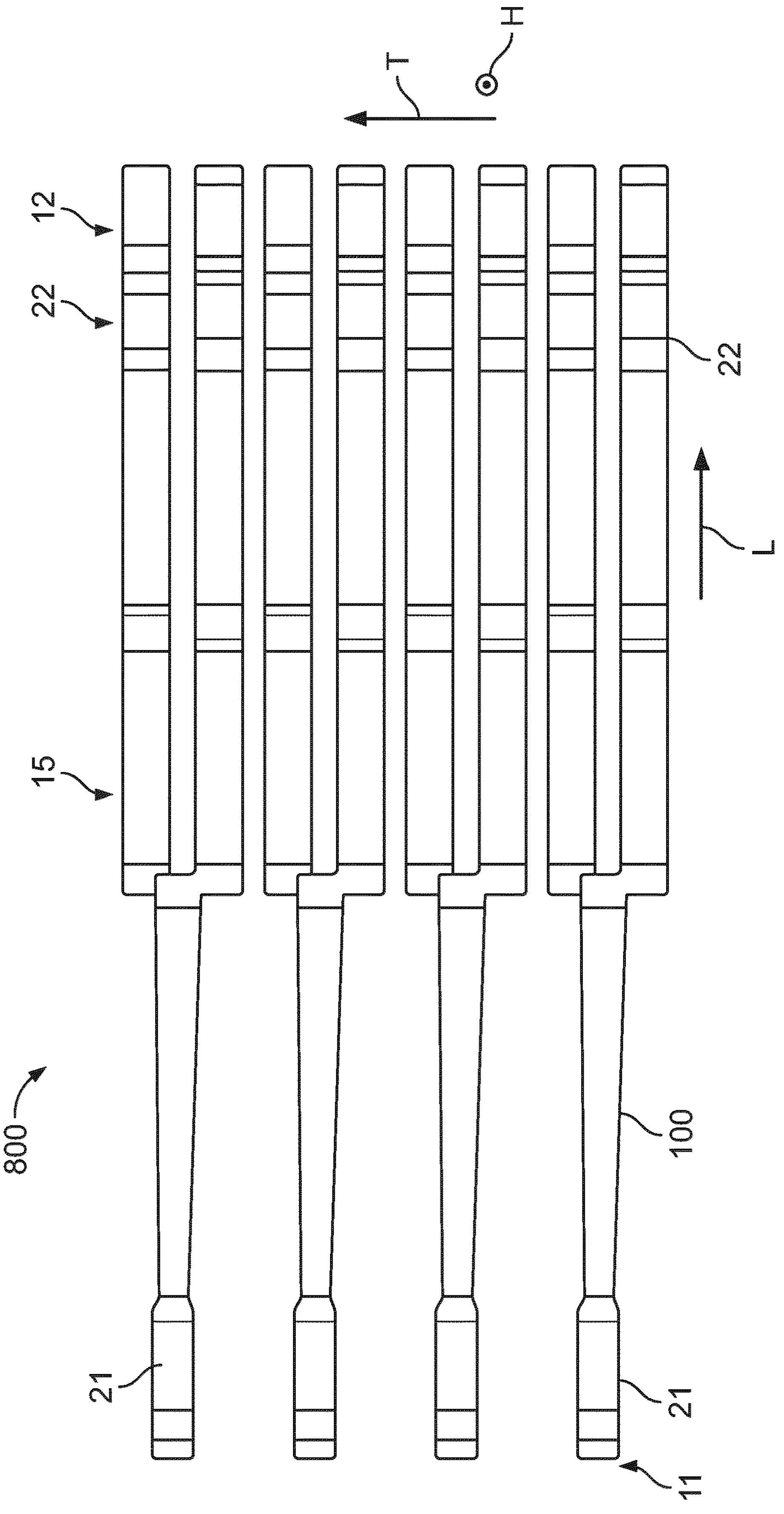
FIG. 27 shows a schematic top view of the embodiment of a contact arrangement shown in FIG. 22.
Figure 28:
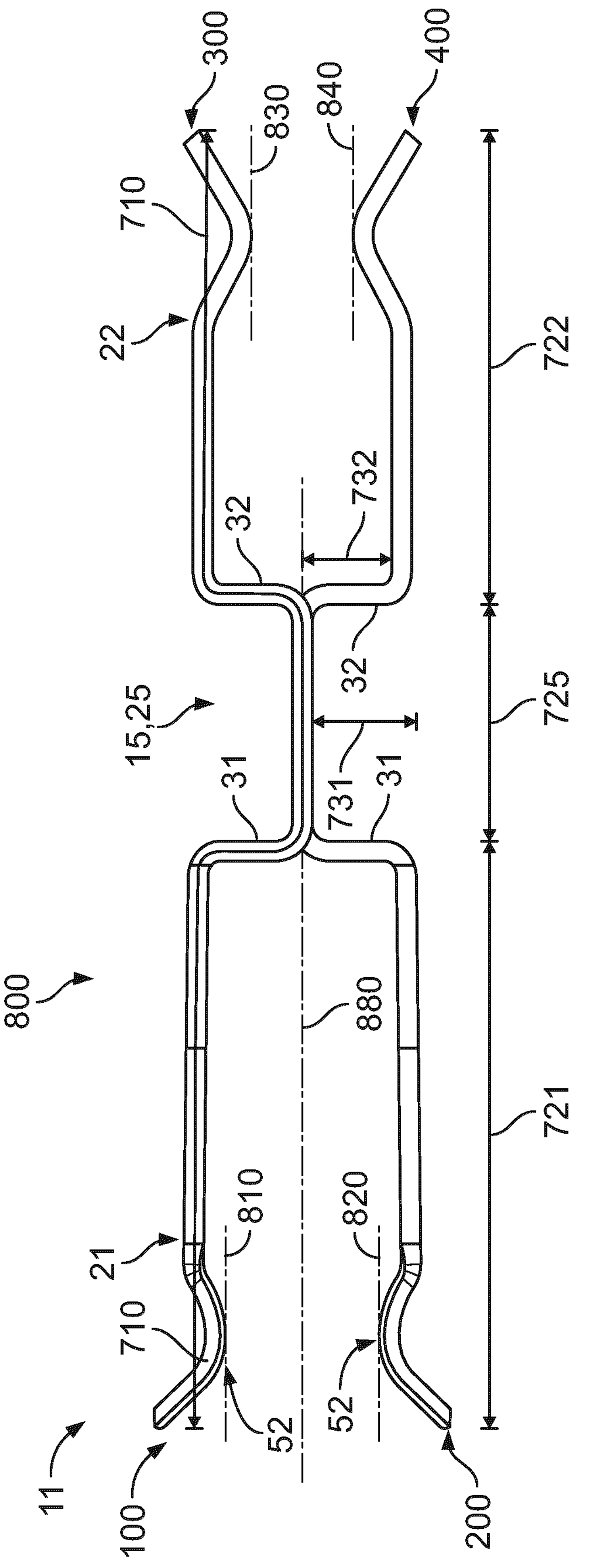
FIG. 28 shows a schematic side view of the embodiment of a contact arrangement shown in FIG. 22.
Figure 29:
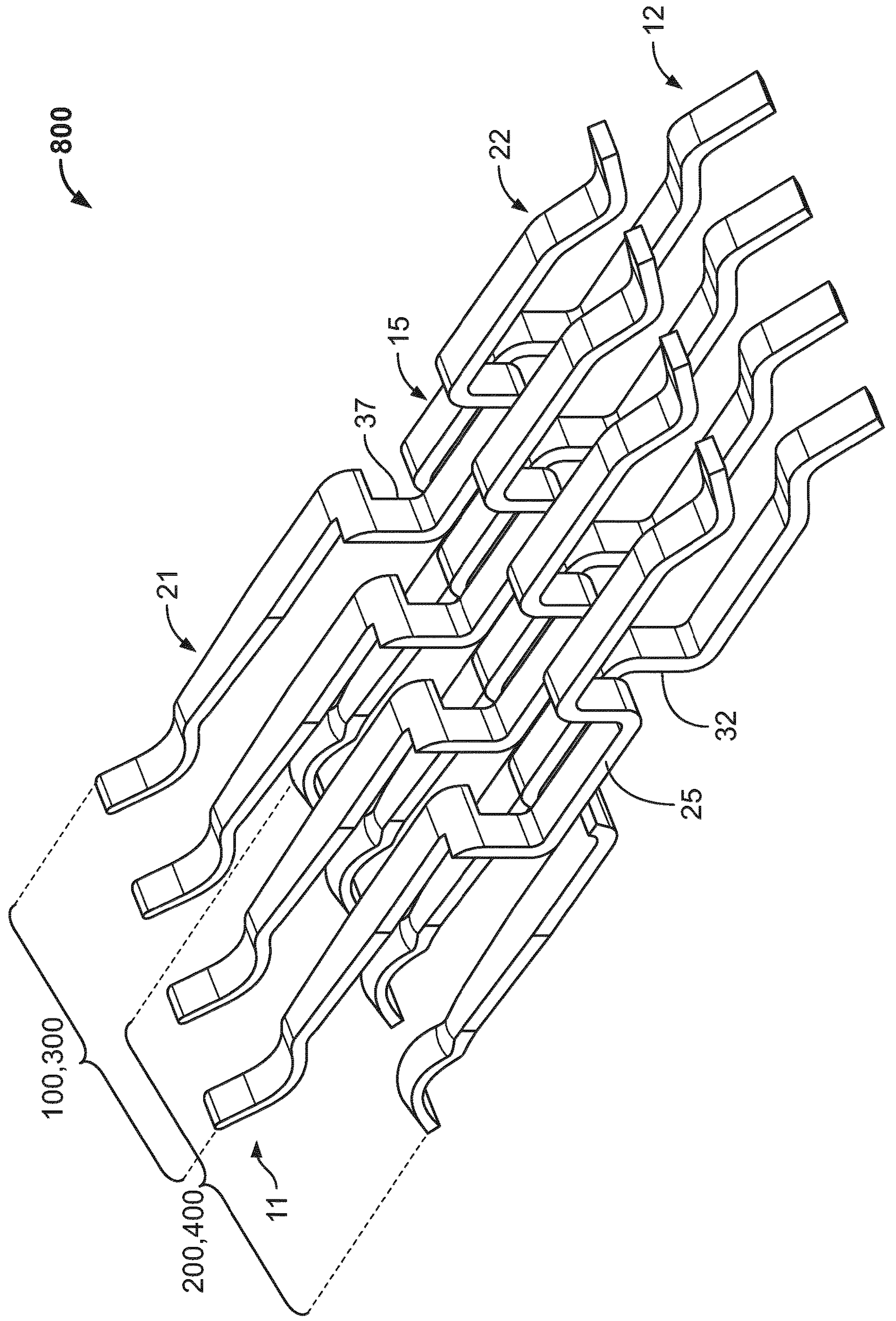
FIG. 29 shows a schematic perspective view of the embodiment of a contact arrangement shown in FIG. 22.
Figure 30:
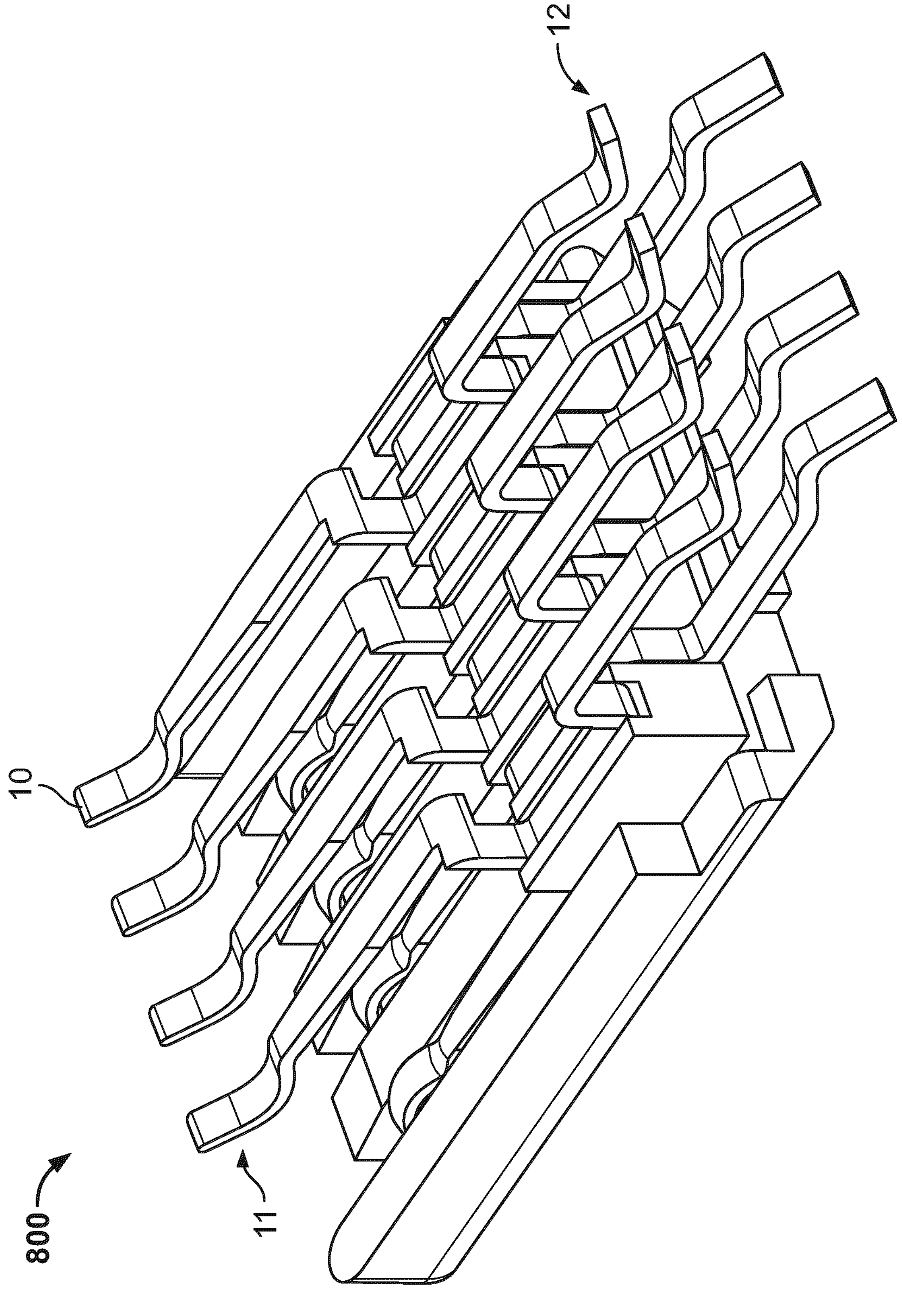
FIG. 30 shows a schematic perspective view of the embodiment of a contact arrangement shown in FIG. 22 together with a support piece.
Figure 31:
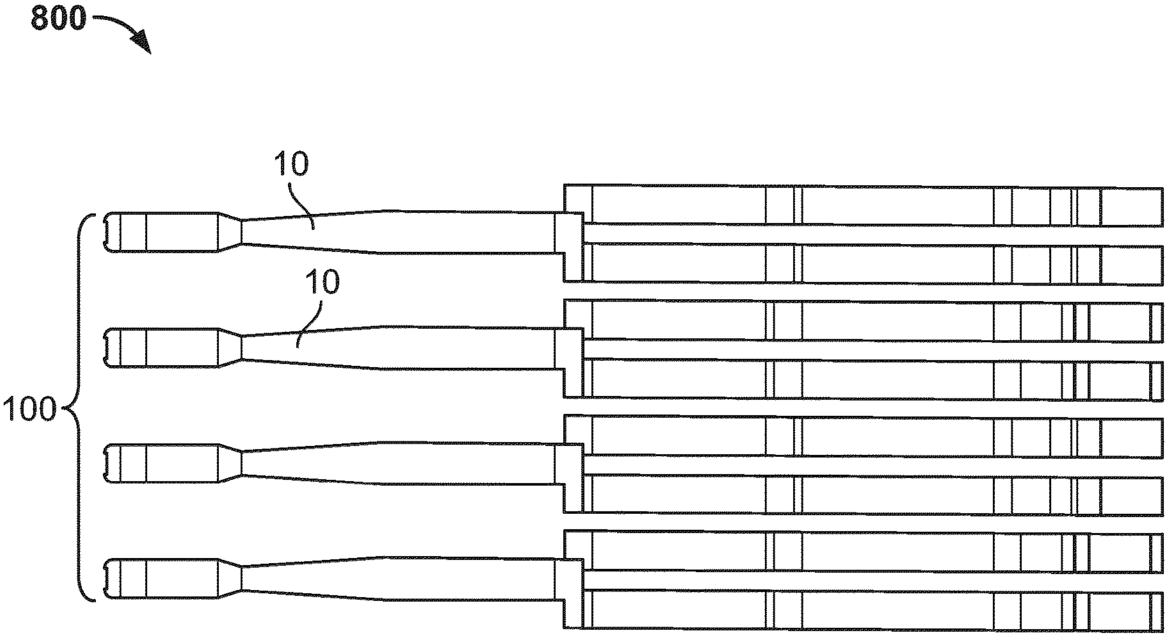
FIG. 31 shows a schematic top view of the embodiment of a contact arrangement shown in FIG. 23.
Figure 32:
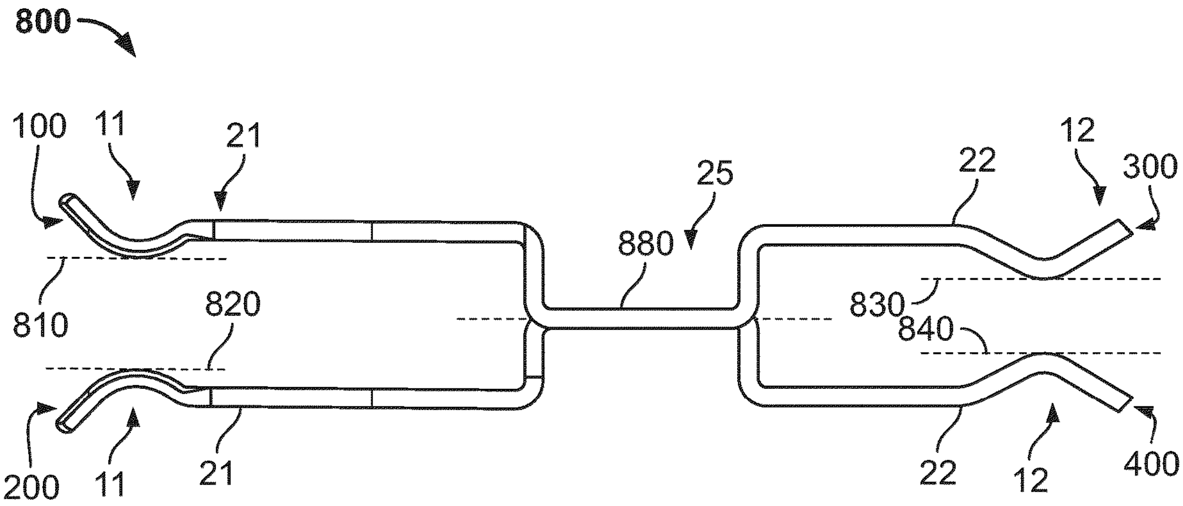
FIG. 32 shows a schematic side view of the embodiment of a contact arrangement shown in FIG. 23.
Figure 33:
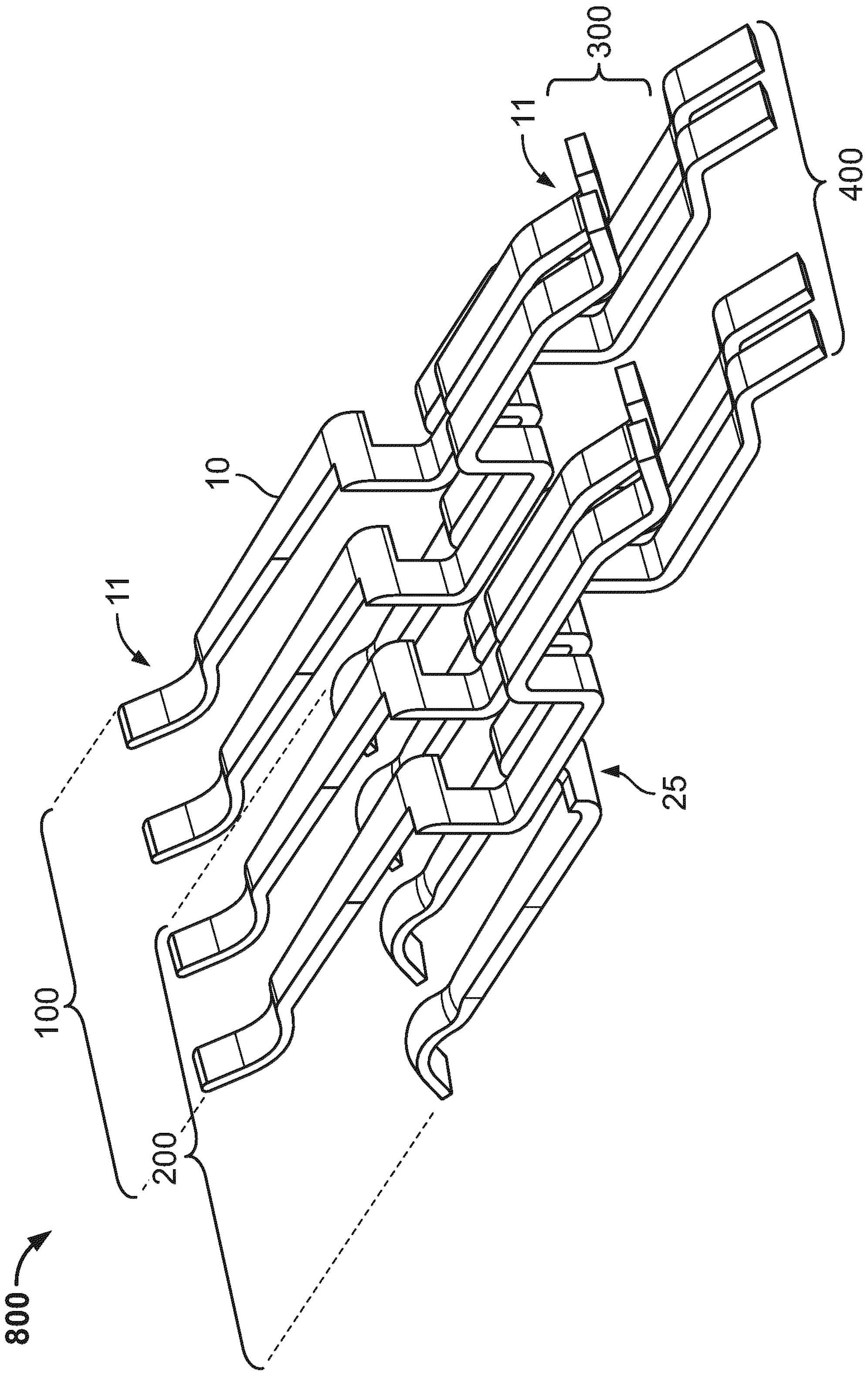
FIG. 33 shows a schematic perspective view of the embodiment of a contact arrangement shown in FIG. 23.
Figure 34:
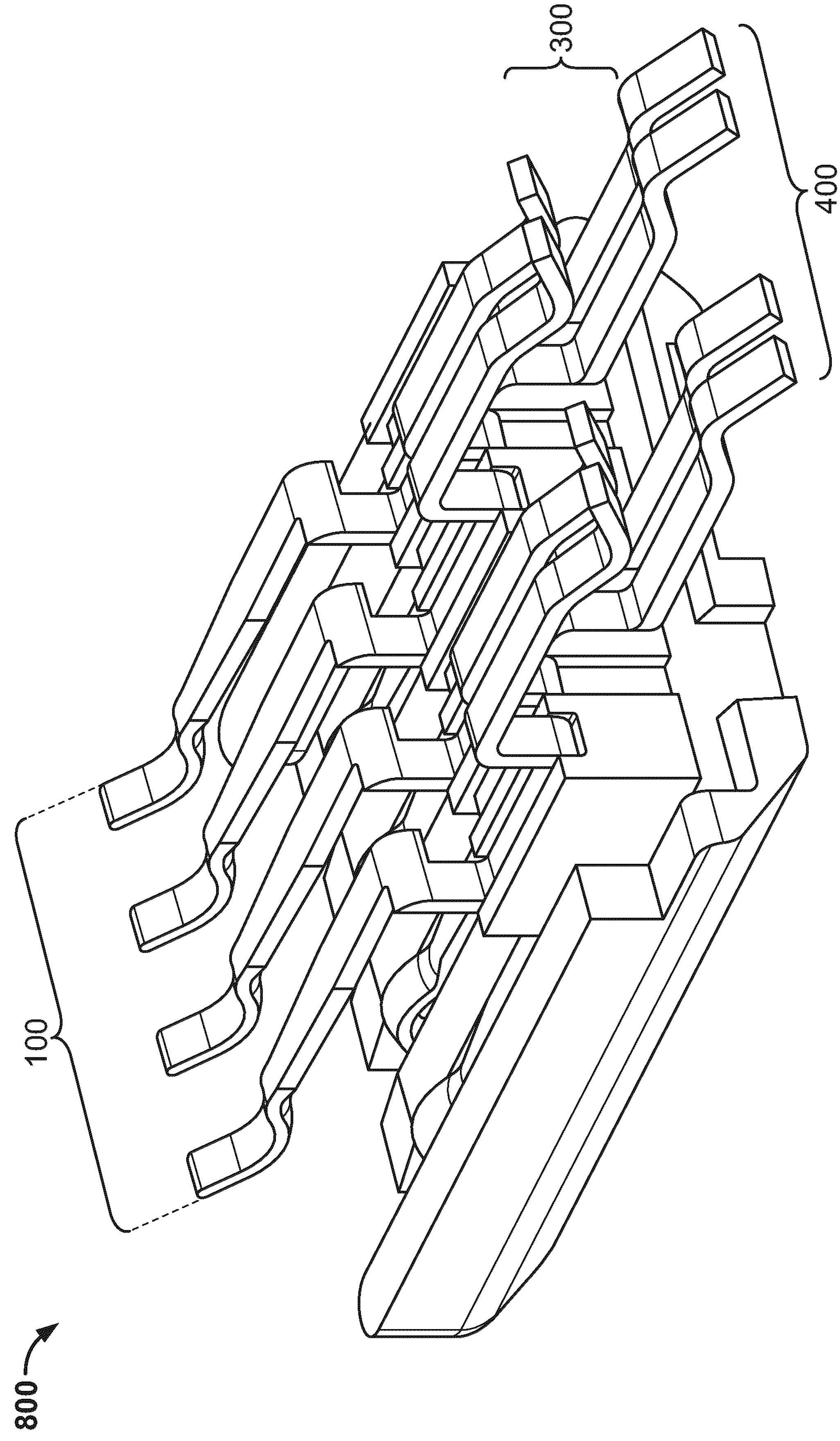
FIG. 34 shows a schematic perspective view of the embodiment of a contact arrangement shown in FIG. 23 together with a support piece.
Figure 35:
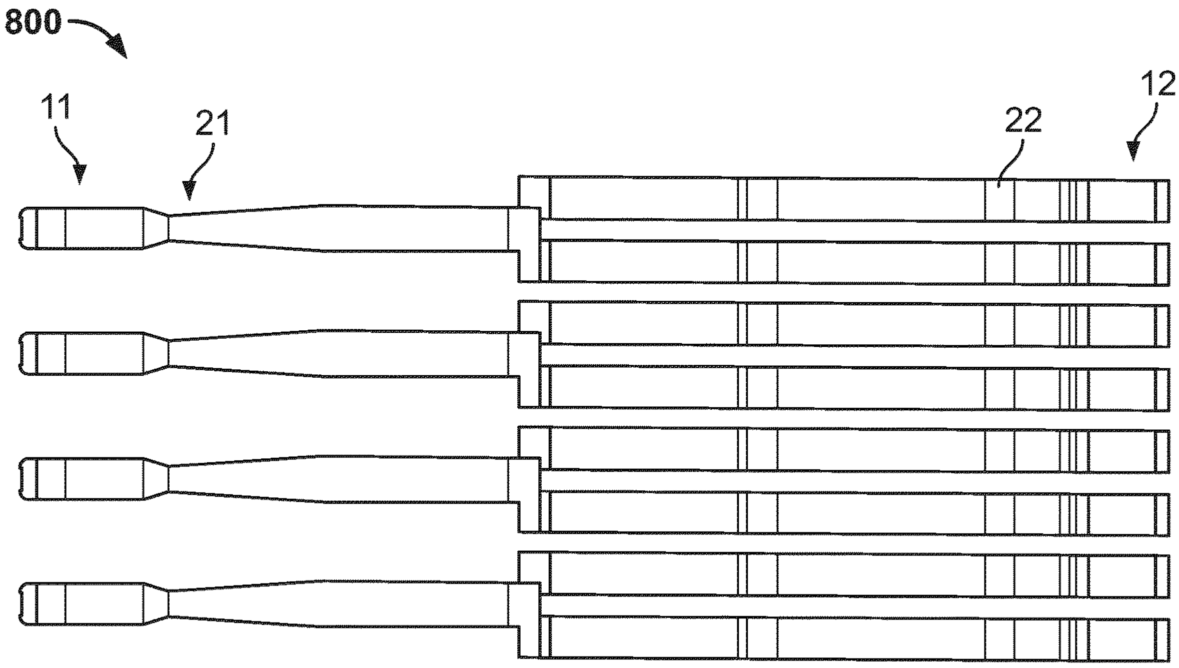
FIG. 35 shows a schematic top view of the embodiment of a contact arrangement shown in FIG. 25.
Figure 36:
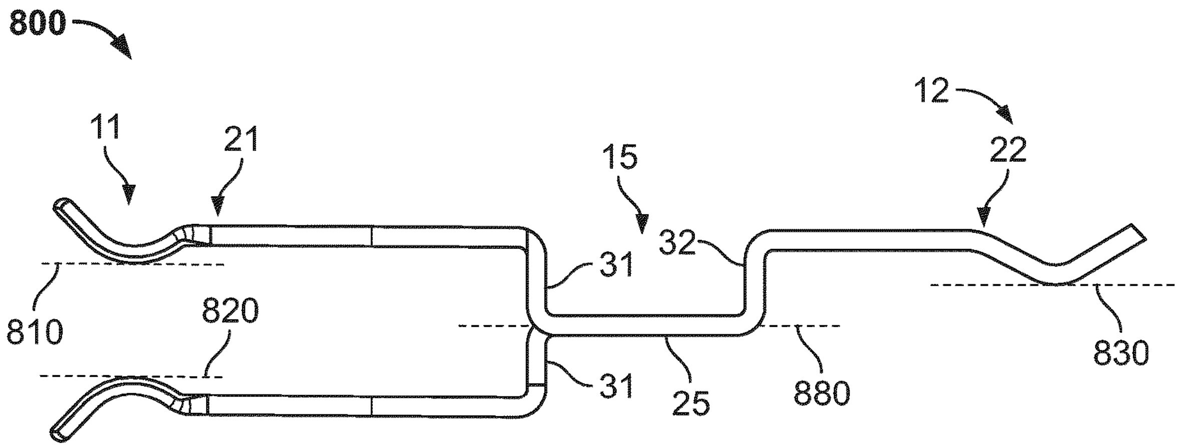
FIG. 36 shows a schematic side view of the embodiment of a contact arrangement shown in FIG. 25.
Figure 37:
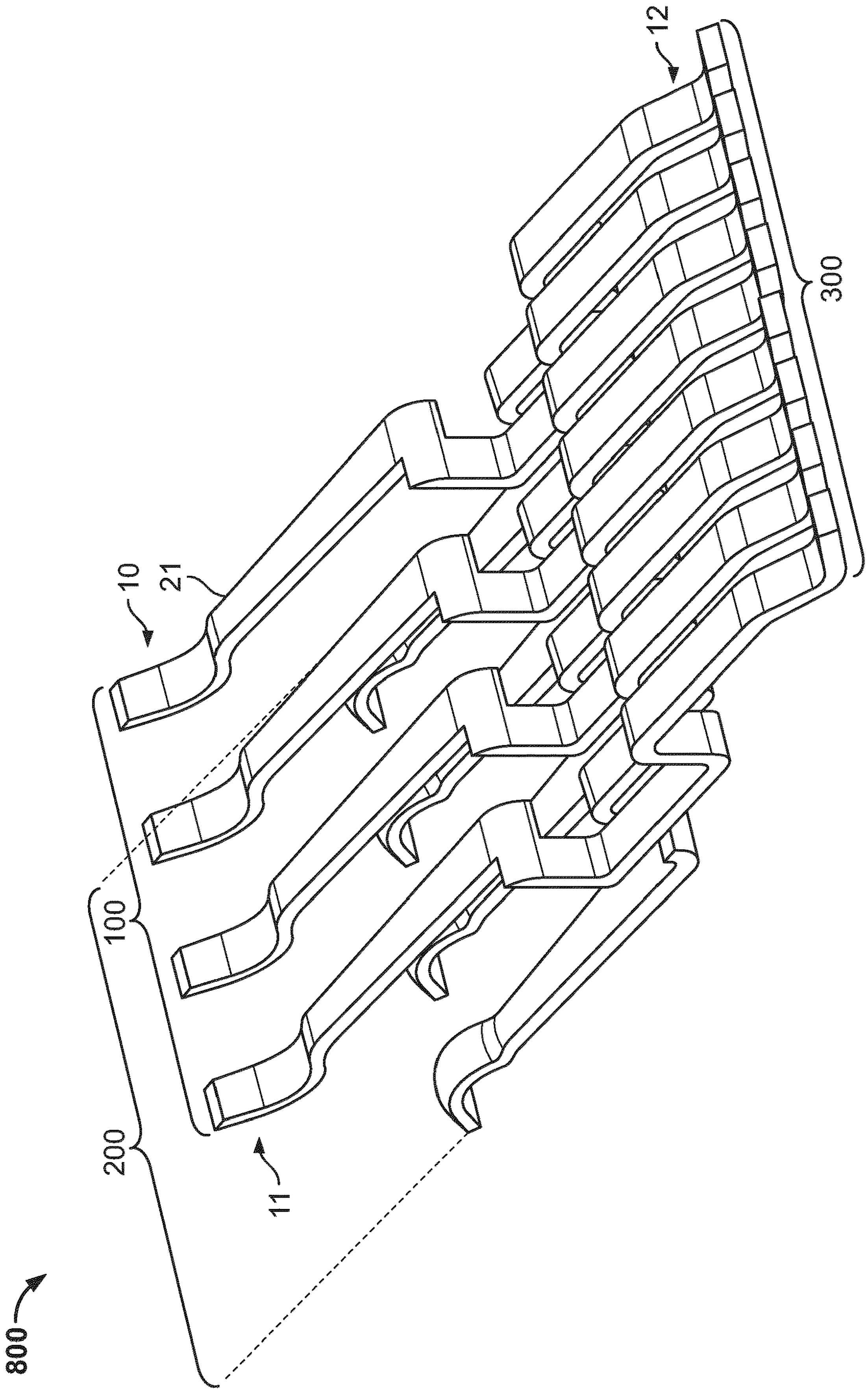
FIG. 37 shows a schematic perspective view of the embodiment of a contact arrangement shown in FIG. 25.
Figure 38:
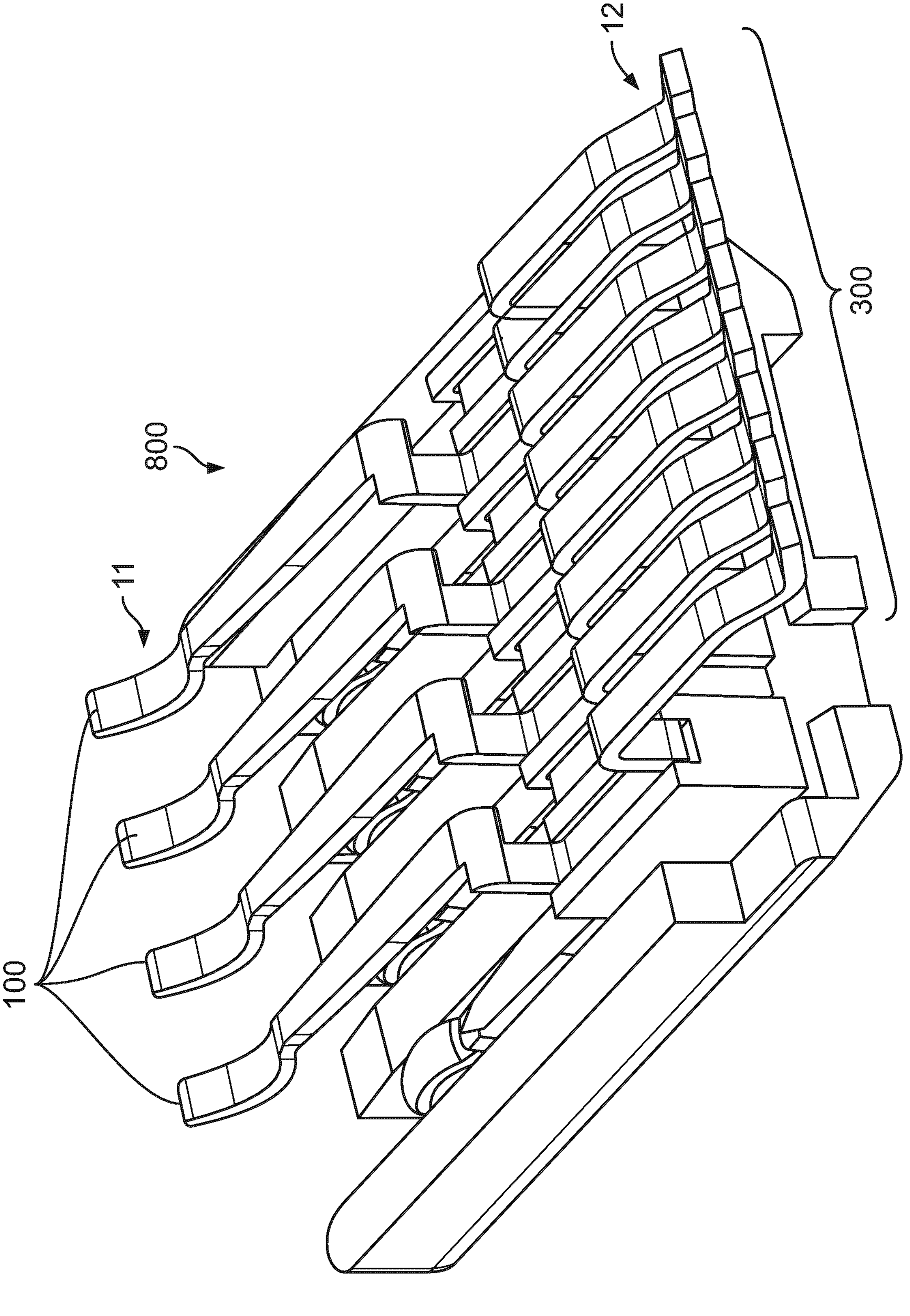
FIG. 38 shows a schematic perspective view of the embodiment of a contact arrangement shown in FIG. 25 together with a support piece.

In FIG. 24, a second group of contact arrangements 800 is shown. This group has in common that at the second end section 22, only one side of a PCB 70 is contacted. The difference between the embodiments shown in FIGS. 25 and 26 is that the contact elements 10 are spaced further apart from each other on the PCB 70 at the second connection side 12 in order to reduce a cross talk.

The embodiment of FIG. 22 is shown in more detail in FIGS. 27 to 30. In this embodiment, all the contact elements 10 are identical. Each of the contact elements 10 is, however, rotated 180° around the longitudinal or length direction L to the neighboring contact elements 10 so that a first subset 100 of the contact elements 10 associated with the first plane 810 comprises the same contact elements as the third subset of contact elements 10 associated with the third plane 830. Similarly, the second subset 200 associated with the second plane 870 comprises the same contact element 10 as the fourth subset 400 associated with the fourth plane 840. However, all of the intermediate sections 25 of the contact elements 10 lie in a common plane 880 in the compensation area 15; this can improve transmission performance.

The contact elements 10 of the first subset 100 and the second subset 200 may be in particular pairwise overlapping and/or be opposite one another in a direction perpendicular to the first 810 and/or second plane 820. The contact elements 10 of the third and fourth subset 300, 400 may be in particular pairwise overlapping and/or be opposite one another in a direction perpendicular to the third and fourth plane 830, 840.

The intermediate section 15 of each contact element can extend along a length 725 that is at least 10%, 20%, or 30% of a total length 710 of the contact element 10. The total length 710 can be measured along the bent course of the contact element 10 and can in particular comprise the length 721 of the first end section 21, the length 722 of the second end section 22, the length 725 of the intermediate section 25 and the lengths 731, 732 of the two connection sections 31, 32.

A distance between the first end section 21 and the intermediate section 25 and/or a distance between the second end section 22 and the intermediate section 22, which in this case corresponds substantially to the lengths 731, 732 of the two connection sections 31, 32, is less than one third, less than 20%, or less than 10% of the total length 710. The distance can be defined as the distance between the ends of two straight sections.

In the embodiment shown in FIGS. 31 to 34, the subset 300 associated with the third plane 830 comprises contact elements 10 from the first subset 100 and the second subset 200. Similarly, the subset 400 associated with the fourth plane 840 comprises contact elements 10 from the first subset 100 and the second subset 200. As before, the combination of the first subset 100 and the second subset 200 as well as a combination of the subset 300 and subset 400 comprises all the contact elements 10 of the contact arrangement 800.

In other embodiments, however, further contact elements 10 could be present, for example if the advantages associated with the inventive idea are not necessary. Such further contact elements 10 could, for example, be used for power supply, grounding, or for low transmission rates. The first and the second subset 100, 200 can contain all the contact elements 10 for high transmission signals. The further contact elements do not necessarily have to be configured according to the inventive idea.

In FIGS. 35 to 38, a further embodiment of a contact arrangement 800 is shown. In this example, the second end sections 22 of the contact elements 10 are configured to contact a single plane 830. The third subset 300 thus comprises all the contact elements 10 from the first subset 100 and the second subset 200.In FIGS. 39 to 42, further possible embodiments are shown schematically.

Figure 39:
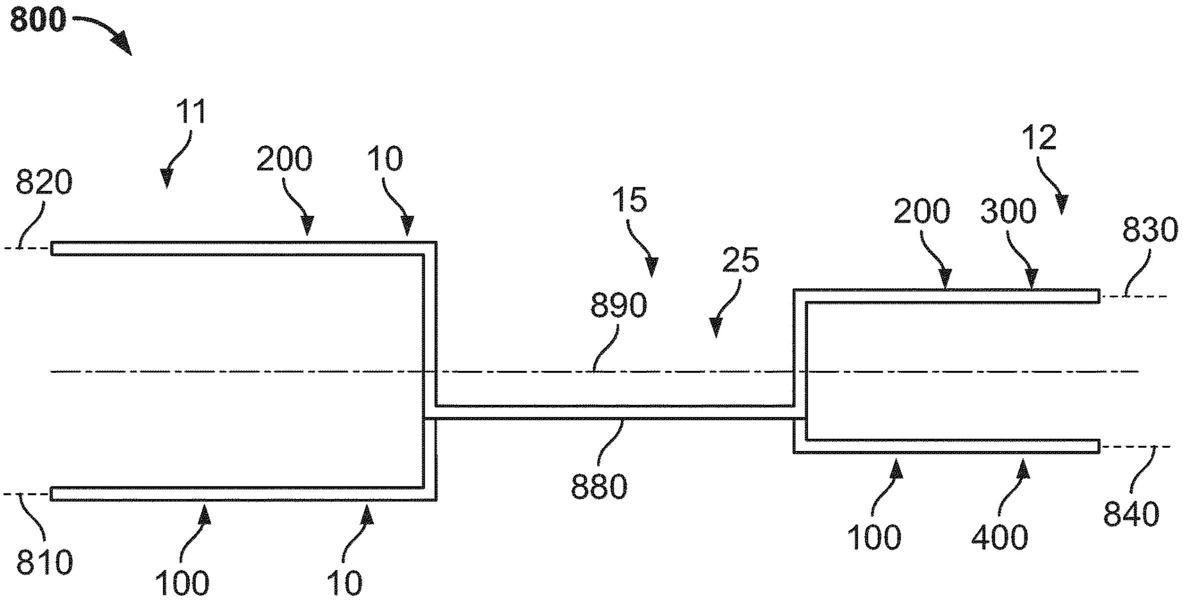
FIG. 39 shows a schematic representation of a side view of a further embodiment of a contact arrangement.

In FIG. 39, the common plane 880 of the intermediate sections 25 lies between the first plane 810 and the second plane 820 and between the third plane 830 and the fourth plane 840, but shifted away from the exact middle plane 890 between the two respective planes 810, 820, 830, 840.

Figure 40:
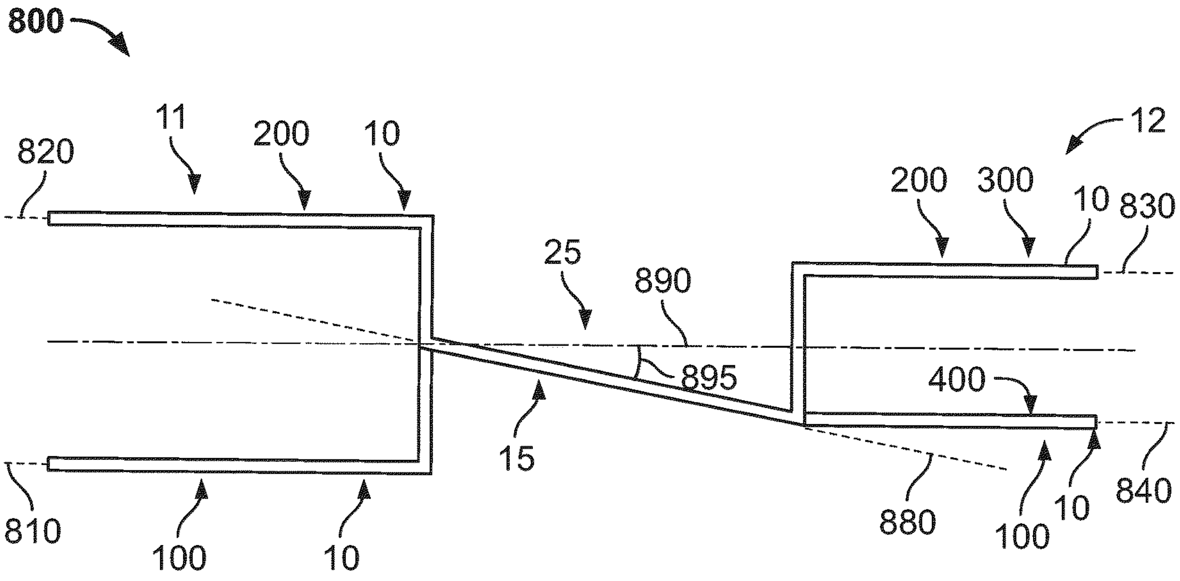
FIG. 40 shows a schematic representation of a side view of a further embodiment of a contact arrangement.

In FIG. 40, the common plane 880 of the intermediate sections 25 is tilted or at an angle 895 to the first plane 810, the second plane 820, the third plane 830, the fourth plane 840 and the middle plane 890.

Figure 41:
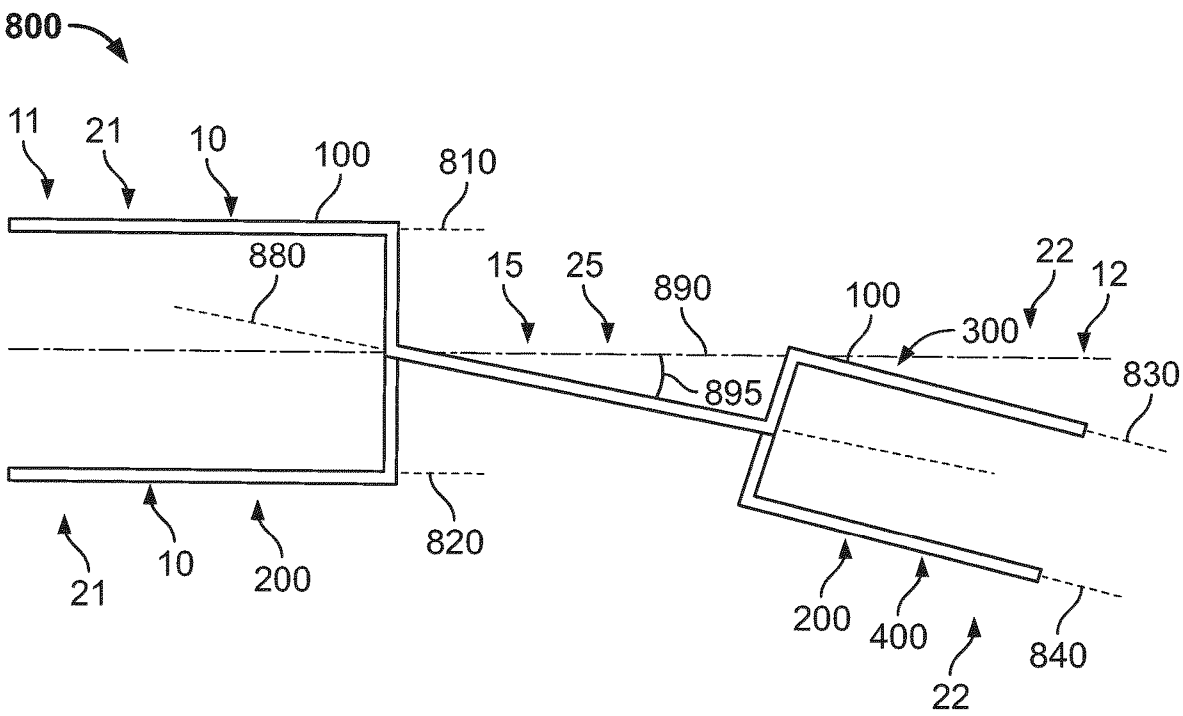
FIG. 41 shows a schematic representation of a side view of a further embodiment of a contact arrangement.

In FIG. 41, the common plane 880 of the intermediate sections 25 is again tilted or at an angle 895 to the first plane 810, the second plane 820, and the middle plane 890. However, the common plane 880 is parallel to the third plane 830 and the fourth plane 840. The pluralities of the first end sections are tilted or at an angle to the pluralities of the second end sections 22 and the intermediate sections 25.

Figure 42:
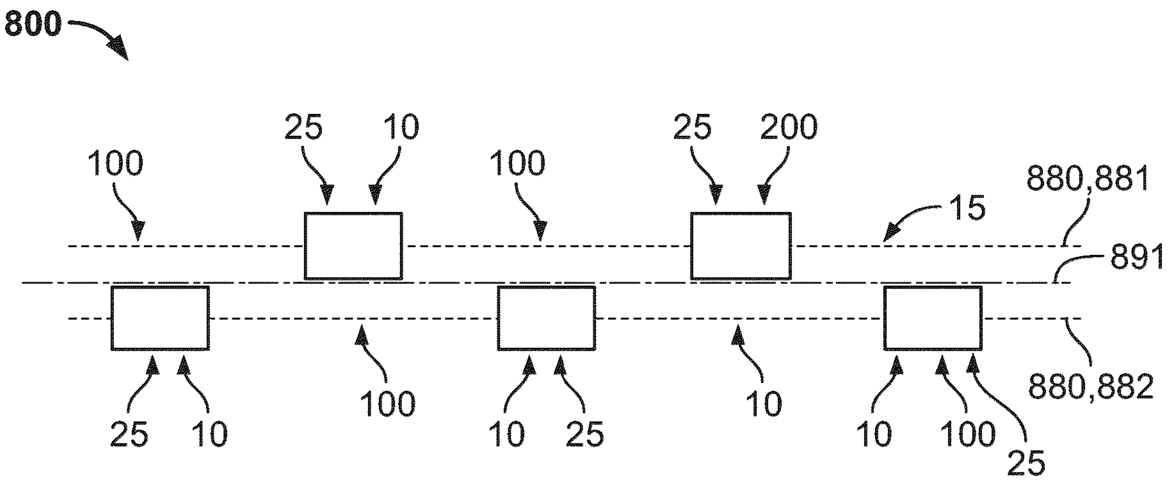
FIG. 42 shows a schematic representation of a cross sectional view of a further embodiment of a contact arrangement.
Figure 43:
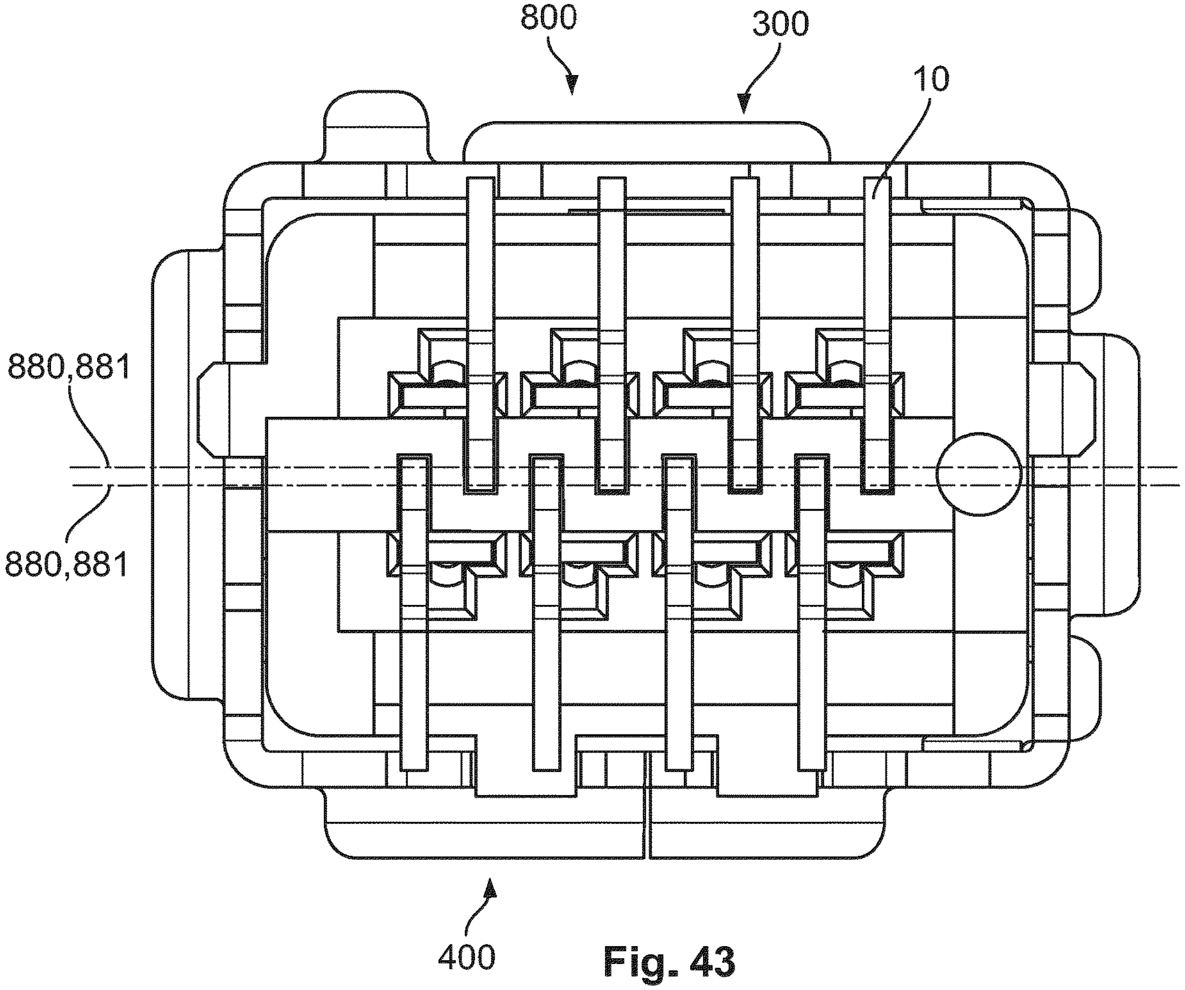
FIG. 43 shows a schematic front view of a further embodiment of a contact arrangement.
Figure 44:
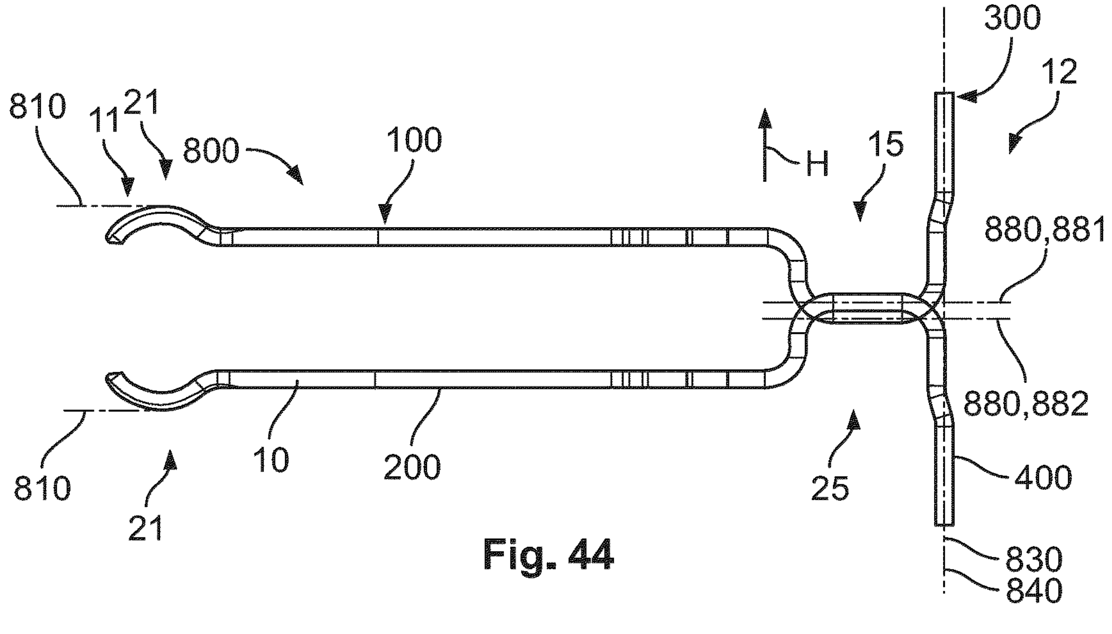
FIG. 44 shows a schematic side view of the further embodiment of FIG. 43.
Figure 45:
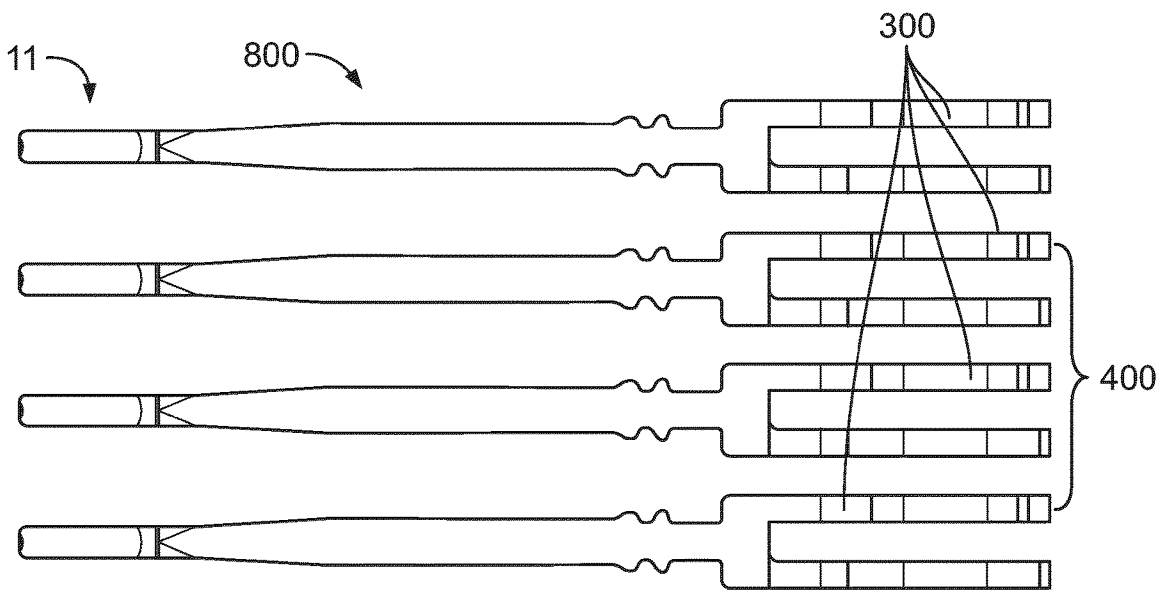
FIG. 45 shows a schematic top view of the further embodiment of FIG. 43.
Figure 46:
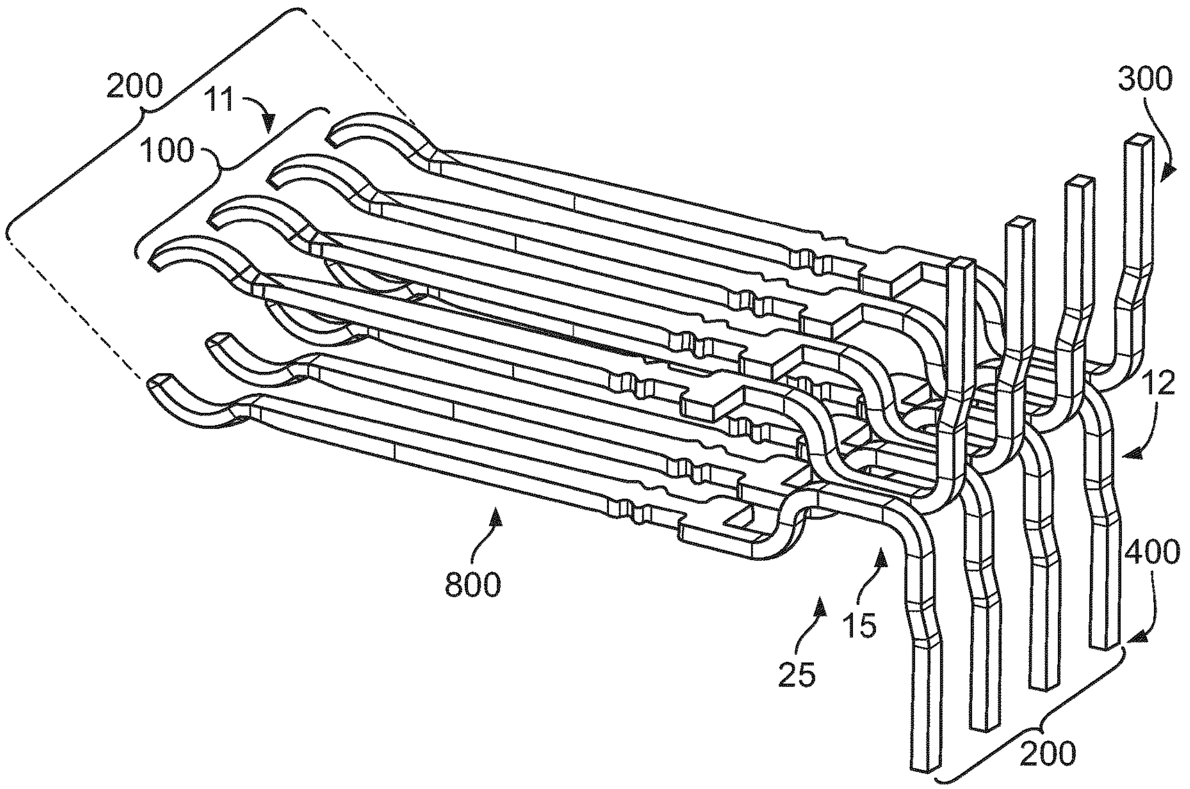
FIG. 46 shows a schematic perspective view of the further embodiment of FIG. 43.
Figure 47:
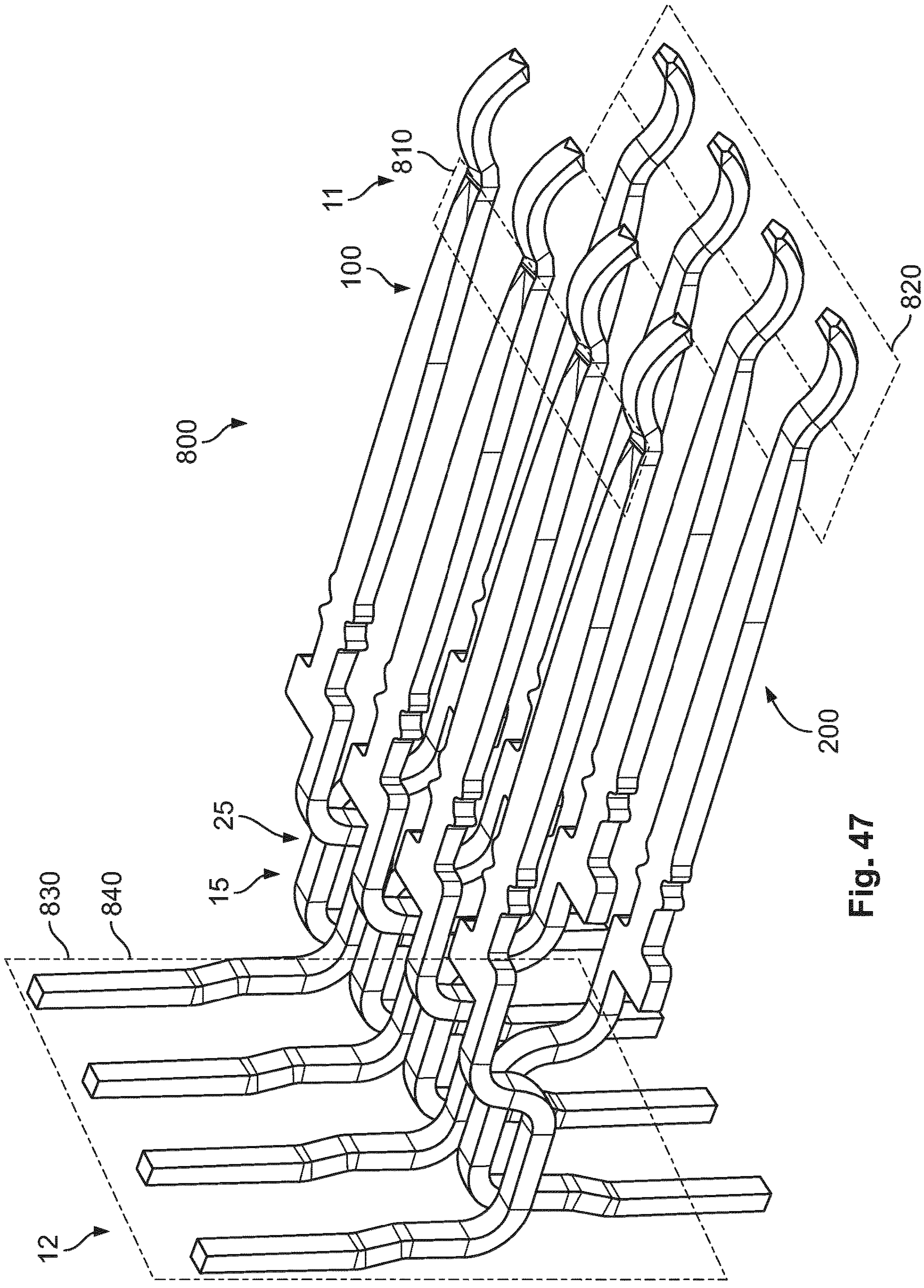
FIG. 47 shows a schematic perspective view of the further embodiment of FIG. 43 from a different angle.
Figure 48:
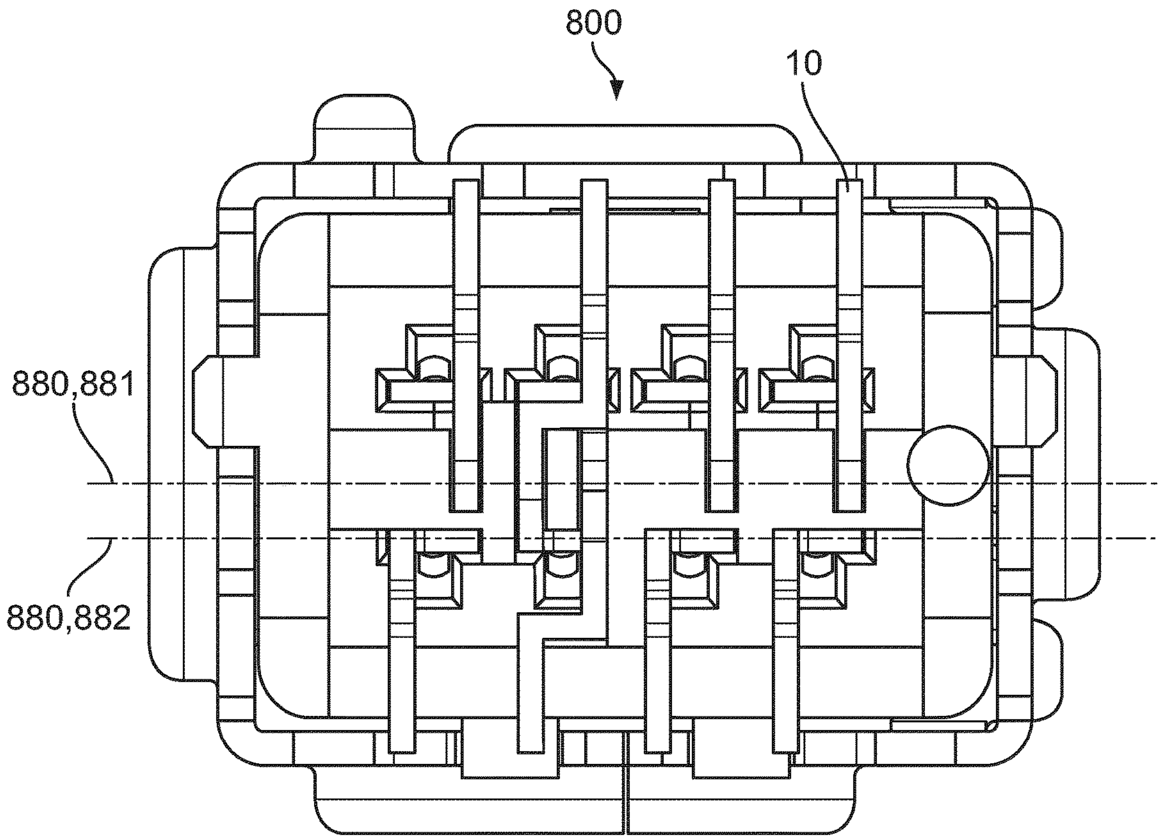
FIG. 48 shows a schematic front view of a further embodiment of a contact arrangement.
Figure 49:
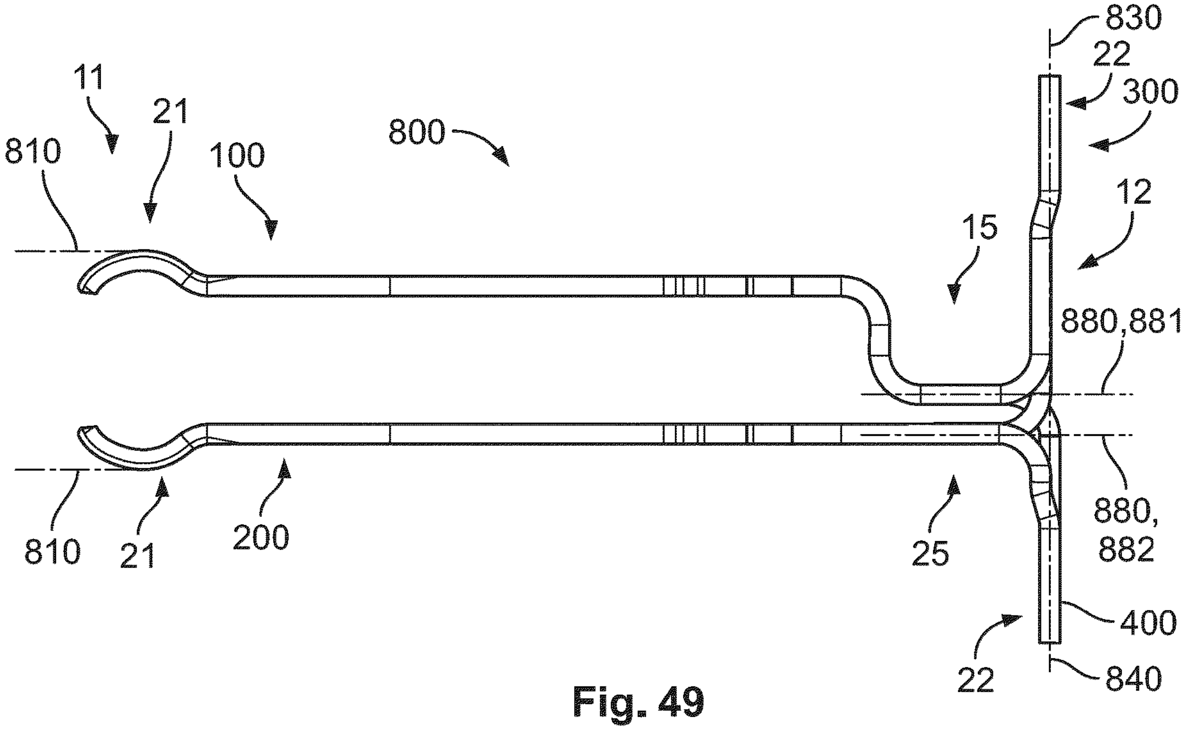
FIG. 49 shows a schematic side view of the further embodiment of FIG. 48.
Figure 50:
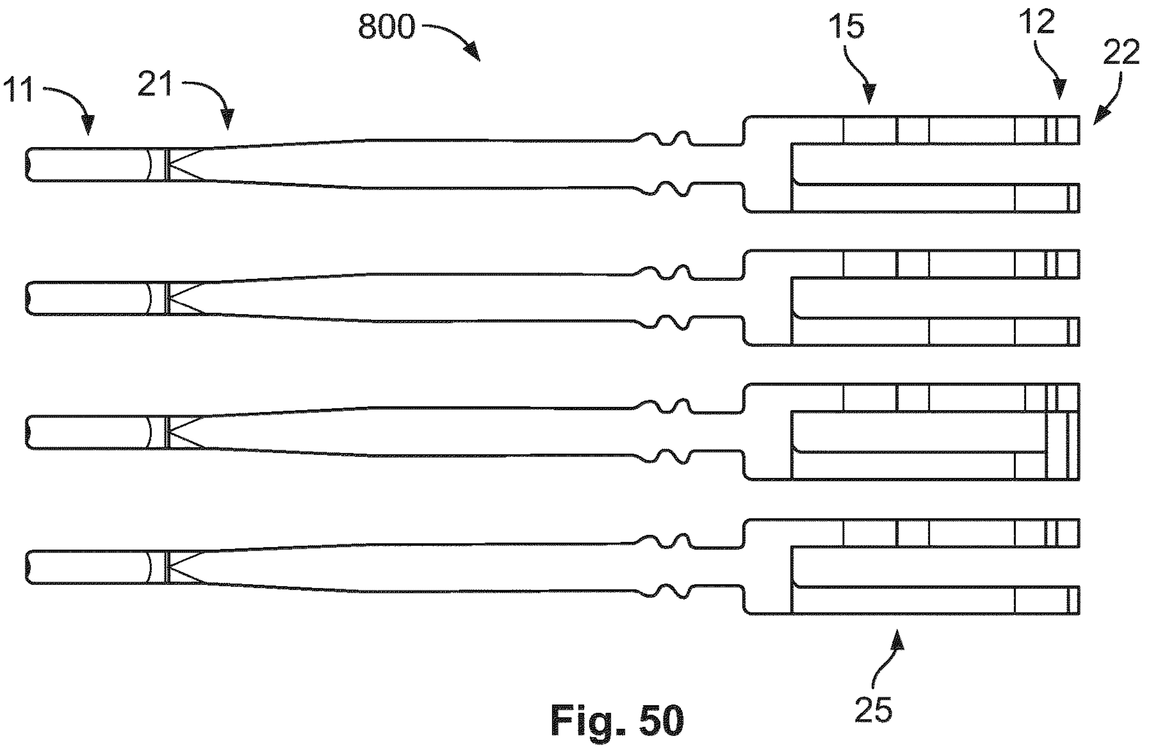
FIG. 50 shows a schematic top view of the further embodiment of FIG. 48.
Figure 51:
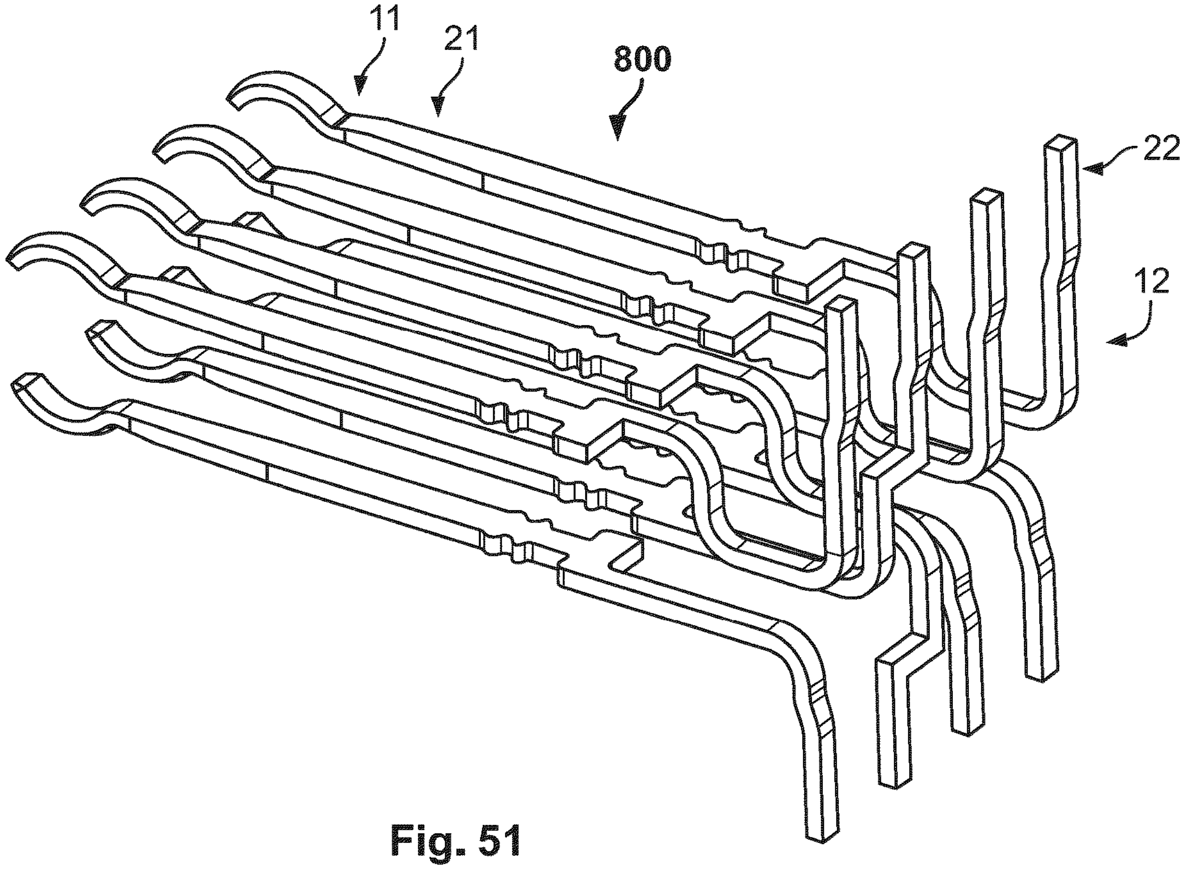
FIG. 51 shows a schematic perspective view of the further embodiment of FIG. 48.
Figure 52:
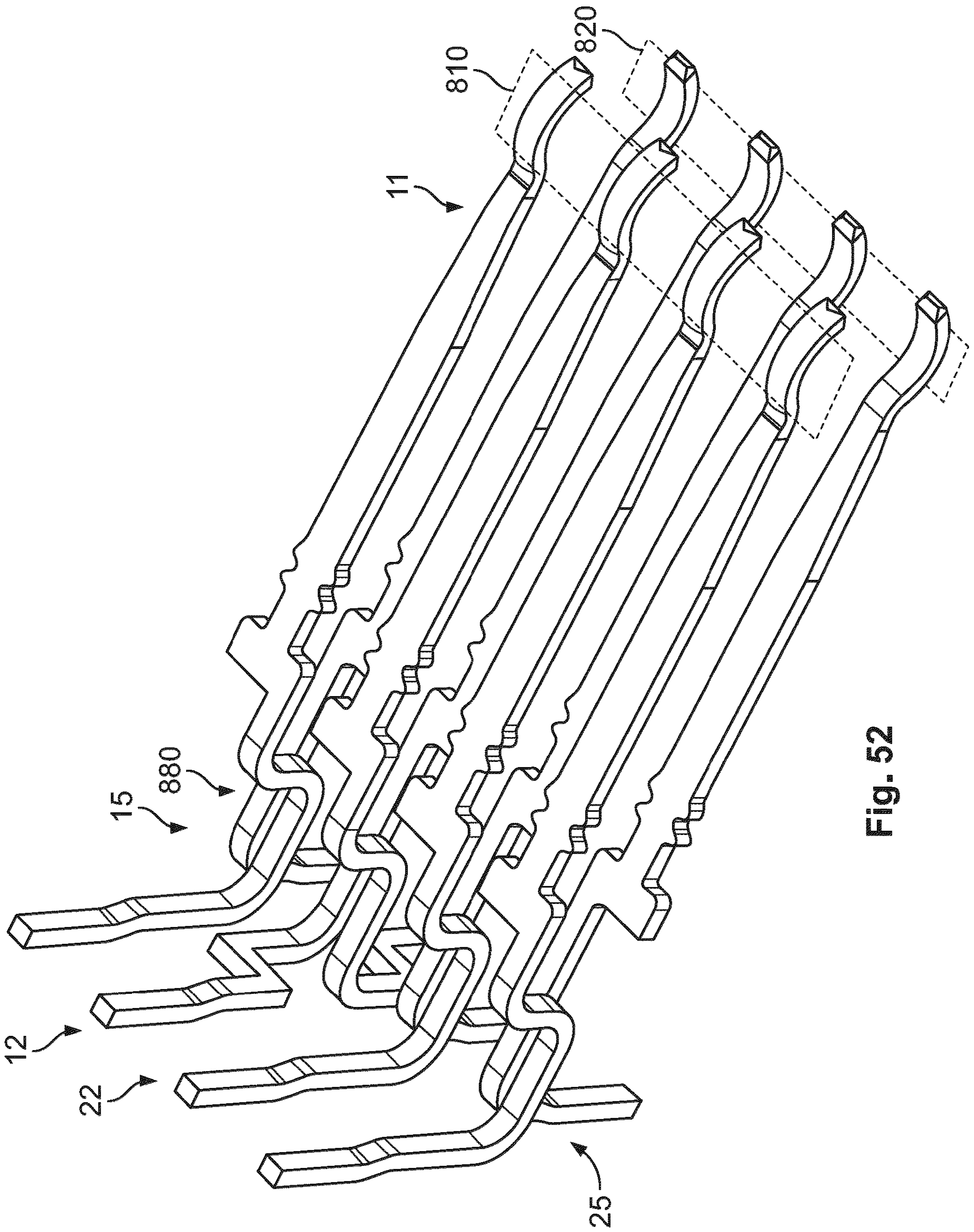
FIG. 52 shows a schematic perspective view of the further embodiment of FIG. 48 from a different angle.
Figure 53:
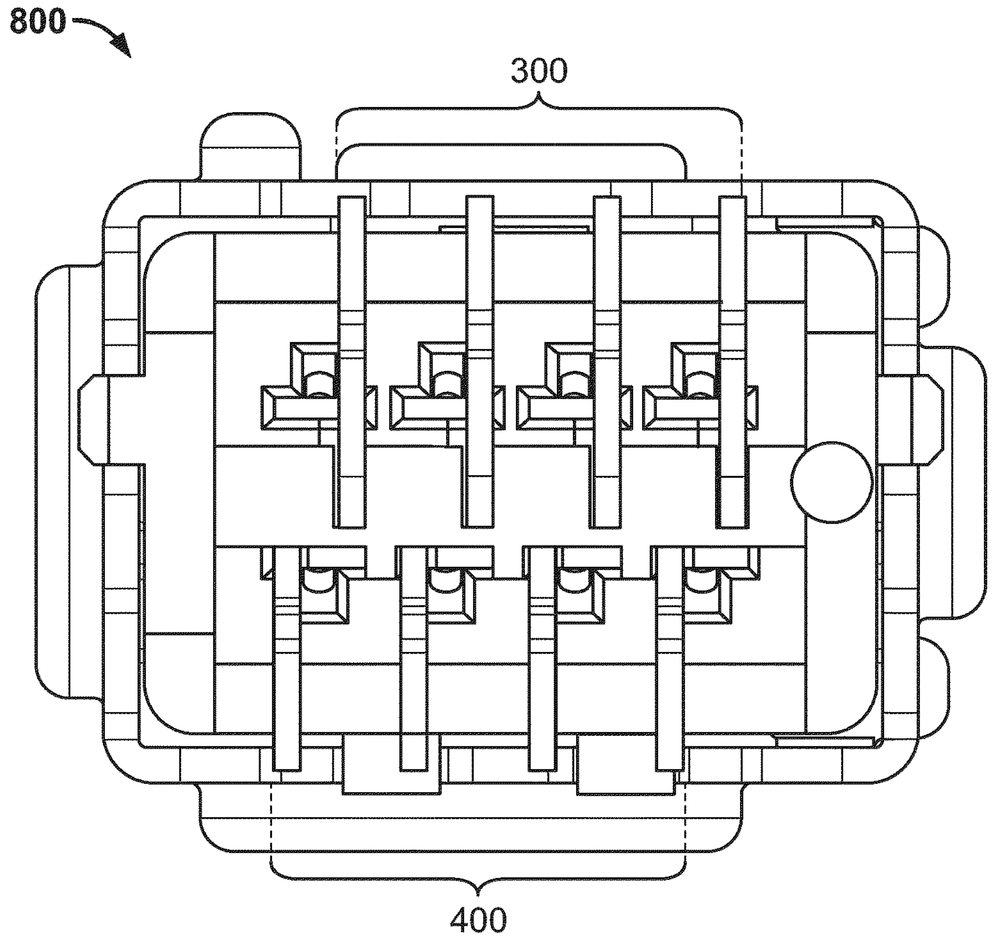
FIG. 53 shows a schematic front view of a further embodiment of a contact arrangement.
Figure 54:
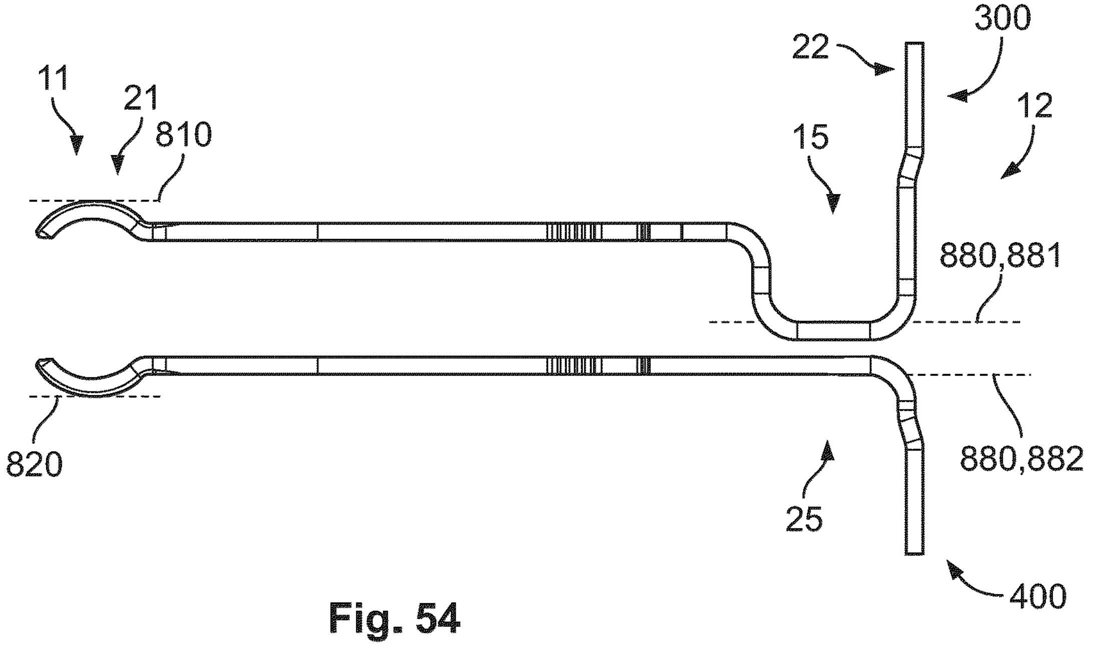
FIG. 54 shows a schematic side view of the further embodiment of FIG. 53.
Figure 55:
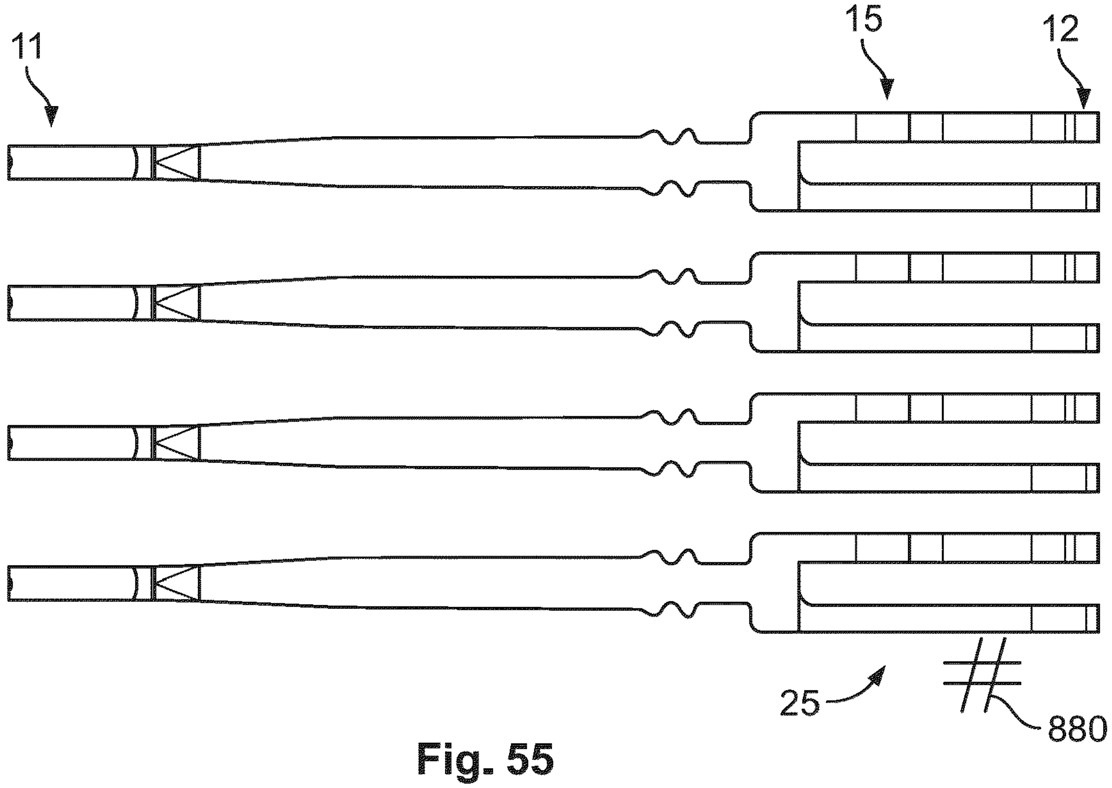
FIG. 55 shows a schematic top view of the further embodiment of FIG. 53.
Figure 56:
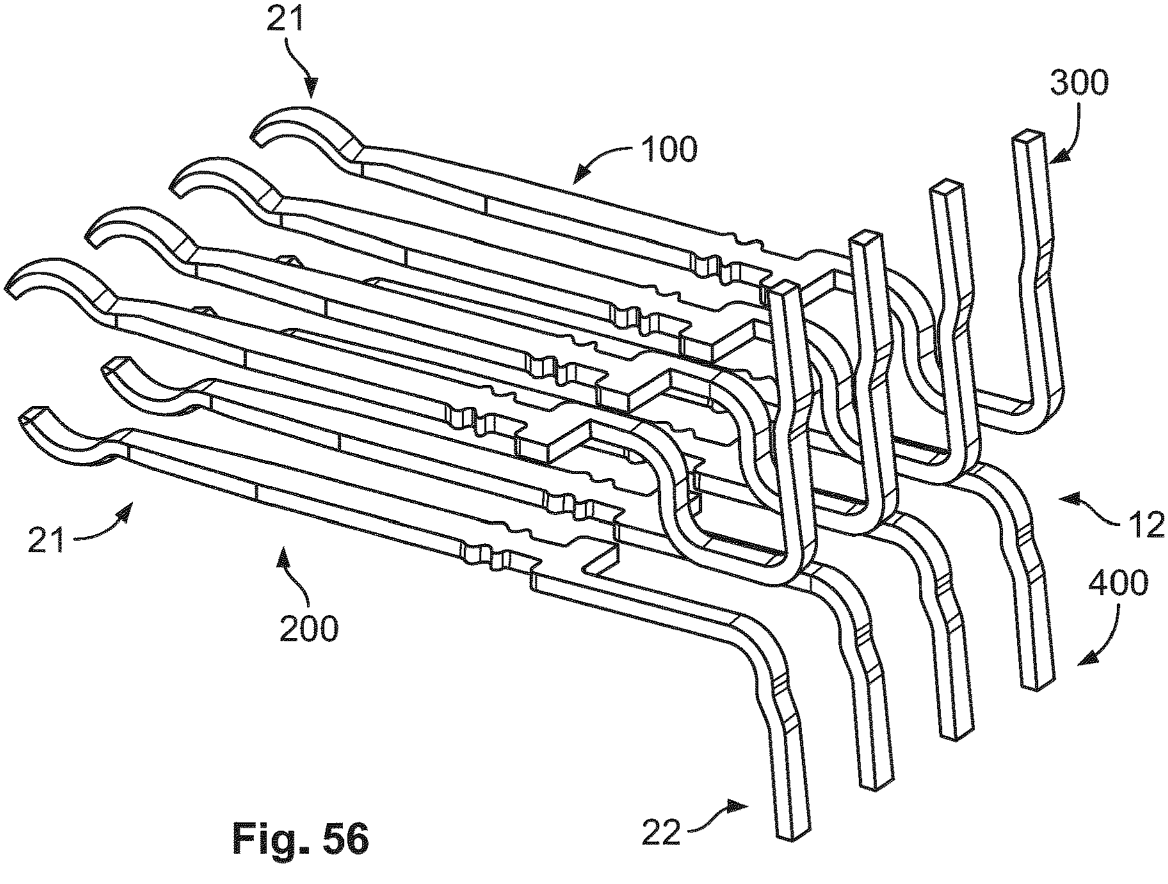
FIG. 56 shows a schematic perspective view of the further embodiment of FIG. 53.
Figure 57:
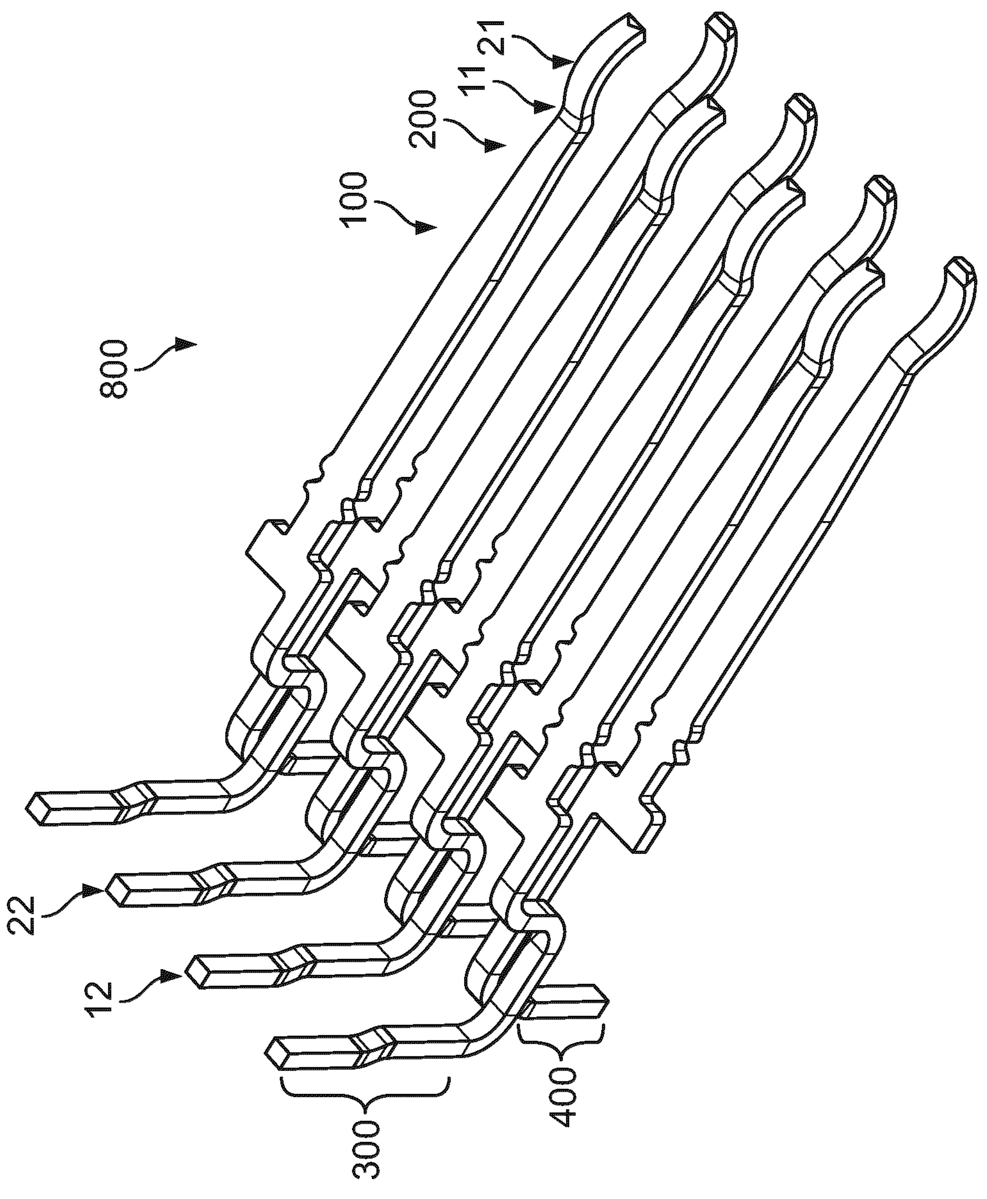
FIG. 57 shows a schematic perspective view of the further embodiment of FIG. 53 from a different angle.

FIG. 42 shows a cross section at the compensation area 15 of a further embodiment. In this embodiment, some intermediate sections 25 lie in a first common plane 880, 881, while other intermediate sections 25 lie in a second common plane 880, 882. This can already result in an improved performance. The two planes 880, 881, 882 lie shifted towards each other with a central plane 891 between them. In the depicted embodiment, the intermediate sections are alternatingly arranged in the first common plane 880, 881 and the second common plane 880, 882 to enlarge the distance between two neighboring intermediate sections 25 and to thus to variate the amount of coupling between them.

In FIGS. 43 to 47, a further embodiment of a contact arrangement 800 is shown. At the second connection side

12, second end sections 22 of a third subset 300 of the contact elements 10 are configured to contact external elements in a third plane 830 and second end sections 22 of a fourth subset 400 of the contact elements 10 are configured to contact external elements in a fourth plane 840. The fourth plane 840 is identical to the third plane 830. The third plane 830 is perpendicular to the first plane 810 and the second place 820. The second end sections 22 extend along the height direction H. However, the second end sections 22 of the third subset 300 and the fourth subset 400 extend at 180 degrees to each other away from the first plane 810 and the second plane 820. In this embodiment, the first subset 100 is identical to the third subset 300, and the second subset 200 is identical to the fourth subset 400.

Intermediate sections 25 of the first subset 100 lie in a first common plane 880, 881. Intermediate sections 25 of the second subset 200 lie in a second common plane 880, 882, that is spaced from the first common plane 880, 881 in the height direction H.

In FIGS. 48 to 52, a further embodiment of a contact arrangement 800 is shown. Again, at the second connection side 12, second end sections 22 of a third subset 300 of the contact elements 10 are configured to contact external elements in a third plane 830 and second end sections 22 of a fourth subset 400 of the contact elements 10 are configured to contact external elements in a fourth plane 840. The fourth plane 840 is identical to the third plane 830. The third plane 830 is perpendicular to the first plane 810 and the second place 820. The second end sections 22 extend along the height direction H. However, the second end sections 22 of the third subset 300 and the fourth subset 400 extend at 180 degrees to each other away from the first plane 810 and a second plane 820. In this embodiment, the first subset 100 is not identical to the third subset 300, and the second subset 200 is not identical to the fourth subset 400. Rather, one contact element 10 of the first subset 100 is not part of the third subset 300 but part of the fourth subset 400. Similarly, one contact element 10 of the second subset 200 is not part of the fourth subset 400 but part of the third subset 300

Intermediate sections 25 of the first subset 100 lie in a first common plane 880, 881. Intermediate sections 25 of the second subset 200 lie in a second common plane 880, 882, that is spaced from the first common plane 880, 881 in the height direction H. In this embodiment, the intermediate sections 25 of the second subset are not separated from the first end sections 21 by steps.

In FIGS. 53 to 57, a further embodiment of a contact arrangement 800 is shown. At the second connection side 12, second end sections 22 of a third subset 300 of the contact elements 10 are configured to contact external elements in a third plane 830 and second end sections 22 of a fourth subset 400 of the contact elements 10 are configured to contact external elements in a fourth plane 840. The fourth plane 840 is identical to the third plane 830. The third plane is perpendicular to the first plane 810 and the second place 820. The second end sections 22 extend along the height direction H. However, the second end sections 22 of the third subset 300 and the fourth subset 400 extend at 180 degrees to each other away from the first plane 810 and a second plane 820. In this embodiment, the first subset 100 is again identical to the third subset 300, and the second subset 200 is identical to the fourth subset 400.

Intermediate sections 25 of the first subset 100 lie in a first common plane 880, 881. Intermediate sections 25 of the second subset 200 lie in a second common plane 880, 882, that is spaced from the first common plane 880, 881 in the height direction H. Like in the previous embodiment, the intermediate sections 25 of the second subset are not separated from the first end sections 21 by steps.

What is claimed is:

1. A contact arrangement for a connector, comprising:

a plurality of contact elements each extending from a first connection side to a second connection side, a plurality of first end sections of a first subset of the contact elements contact a plurality of external elements in a first plane at the first connection side and a plurality of first end sections of a second subset of the contact elements contact a plurality of external elements in a second plane at the first connection side, the second plane is parallel to and spaced from the first plane in a height direction, a plurality of intermediate sections of at least some of the contact elements of the first subset lie in a single common plane with a plurality of intermediate sections of at least some of the contact elements of the second subset.

2. The contact arrangement of claim 1, wherein the intermediate sections extend along at least a tenth of a total length of the contact elements.

3. The contact arrangement of claim 1, wherein a distance between the first end section and the intermediate section of at least one of the contact elements is less than a third of a total length of the contact element.

4. The contact arrangement of claim 1, wherein a plurality of second end sections of the contact element at the second connection side contact a plurality of external elements in a single plane.

5. The contact arrangement of claim 1, wherein the intermediate sections are parallel to each other.

6. The contact arrangement of claim 1, wherein at least one of the contact elements has a connection section connecting the first end section to the intermediate section, the connection section extends perpendicular to the single common plane.

7. The contact arrangement of claim 1, wherein the intermediate sections are in a compensation area between the first connection side and the second connection side.

8. The contact arrangement of claim 1, wherein at least one of the contact elements has a first contact surface on the first connection side and a second contact surface on the second connection side.

9. The contact arrangement of claim 8, wherein the first contact surface and the second contact surface face in a same direction.

10. The contact arrangement of claim 8, wherein the first contact surface and the second contact surface face in opposite directions.

11. The contact arrangement of claim 1, wherein a third subset of the contact elements has a plurality of second end sections at the second connection side contacting a plurality of external elements in a third plane.

12. The contact arrangement of claim 11, wherein a fourth subset of the contact elements has a plurality of second end sections at the second connection side contacting a plurality of external elements in a fourth plane, the fourth plane is parallel to and spaced from the third plane in the height direction.

13. The contact arrangement of claim 1, wherein the intermediate sections of the first subset and the second subset are each parallel to the first plane and the second plane.

14. The contact arrangement of claim 13, wherein the single common plane is between the first plane and the second plane in the height direction.

15. A connector, comprising:

a contact arrangement having a plurality of contact elements each extending from a first connection side to a second connection side, a plurality of first end sections of a first subset of the contact elements contact a plurality of external elements in a first plane at the first connection side and a plurality of first end sections of a second subset of the contact elements contact a plurality of external elements in a second plane at the first connection side, the second plane is parallel to and spaced from the first plane in a height direction, a plurality of intermediate sections of at least some of the contact elements lie in a single common plane, the contact arrangement has a fifth subset of the contact elements that are mechanically coupled to each other and a sixth subset of the contact elements that are mechanically coupled to each other, at least one of the fifth subset and the sixth subset has a pair of contact elements that differ in an orientation of a first contact surface and/or a second contact surface.

16. The connector of claim 15, wherein the contact elements are embedded in a plastic material.

17. The connector of claim 15, wherein the fifth subset is supported in a first support piece and the sixth subset is supported in a second support piece.

18. The connector of claim 15, wherein the contact elements have an identical shape in the fifth subset and the sixth subset and are rotated by 180° relative to each other.

19. A contact arrangement for a connector, comprising:

a plurality of contact elements each extending from a first connection side to a second connection side, a plurality of first end sections of a first subset of the contact elements contact a plurality of external elements in a first plane at the first connection side and a plurality of first end sections of a second subset of the contact elements contact a plurality of external elements in a second plane at the first connection side, the second plane is parallel to and spaced from the first plane in a height direction, a plurality of intermediate sections of at least some of the contact elements lie in a single common plane, a distance between the first end section and the intermediate section of at least one of the contact elements is less than a third of a total length of the contact element.

20. A contact arrangement for a connector, comprising:

a plurality of contact elements each extending from a first connection side to a second connection side, a plurality of first end sections of a first subset of the contact elements contact a plurality of external elements in a first plane at the first connection side and a plurality of first end sections of a second subset of the contact elements contact a plurality of external elements in a second plane at the first connection side, the second plane is parallel to and spaced from the first plane in a height direction, a plurality of intermediate sections of at least some of the contact elements lie in a single common plane, at least one of the contact elements has a first contact surface on the first connection side and a second contact surface on the second connection side, the first contact surface and the second contact surface face in opposite directions.

* * * * *